(12) United States Patent
Fu et al.

(10) Patent No.: US 11,129,205 B2
(45) Date of Patent: Sep. 21, 2021

(54) APPARATUS AND METHOD FOR CONFIGURING CHANNEL RESOURCE IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 16/611,072

(22) PCT Filed: May 4, 2018

(86) PCT No.: PCT/KR2018/005236
§ 371 (c)(1),
(2) Date: Nov. 5, 2019

(87) PCT Pub. No.: WO2018/203735
PCT Pub. Date: Nov. 8, 2018

(65) Prior Publication Data
US 2020/0170043 A1 May 28, 2020

(30) Foreign Application Priority Data

| May 5, 2017 | (CN) | 201710319453.4 |
| Sep. 30, 2017 | (CN) | 201710914183.1 |
| Sep. 30, 2017 | (CN) | 201710928607.X |

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0053* (2013.01); *H04W 72/042* (2013.01); *H04W 74/004* (2013.01); *H04W 74/006* (2013.01)

(58) Field of Classification Search
CPC ............ H04W 72/042; H04W 72/0413; H04L 5/001; H04L 1/1861; H04L 5/0055
See application file for complete search history.

(56) References Cited

U.S. PATENT DOCUMENTS 9,787,451 B2 * 10/2017 Seo ............... H04L 5/0048
10,484,127 B2 * 11/2019 Kim ............... H04W 72/0413
(Continued)

FOREIGN PATENT DOCUMENTS

| KR | 10-2014-0142706 A | 12/2014 |
| WO | 2013/125890 A1 | 8/2013 |

OTHER PUBLICATIONS

International Telecommunication Union; SWG Traffic; Working Document Towards a Preliminary Draft New Report ITU-R M.[IMT.BEYOND2020.TRAFFIC]; IMT Traffic estimates beyond year 2020; Radiocommunication Study Groups; Document 5D/TEMP/466-E; Oct. 21, 2014.
(Continued)

*Primary Examiner* — Chandrahas B Patel
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides a method for configuring channel resource, a corresponding base station and a corresponding user equipment. The method comprises receiving first system information, and deriving resource configuration
(Continued)

information for PDCCH that schedules second information from the received first system information.

18 Claims, 12 Drawing Sheets

(51) Int. Cl.
*H04W 72/04* (2009.01)
*H04W 74/00* (2009.01)

(56) References Cited

U.S. PATENT DOCUMENTS

| | | |
|---|---|---|
| 10,631,330 B2 * | 4/2020 | Vajapeyam ............ H04W 24/08 |
| 2015/0103800 A1 | 4/2015 | Seo et al. |
| 2015/0282215 A1 | 10/2015 | Eriksson et al. |

OTHER PUBLICATIONS

International Telecommunication Union; IMT Vision—Framework and overall objectives of the future development of IMT for 2020 and beyond; M Series Mobile, radiodetermination, amateur and related satellite services; ITU-R; Radiocommunication Sector of ITU; Recommendation ITU-R M.2083-0; Sep. 2015.

International Telecommunication Union; Future technology trends of terrestrial IMT systems; M Series Mobile, radiodetermination, amateur and related satellite services; ITU-R; Radiocommunication Sector of ITU; Report ITU-R M.2320-0; Nov. 2014.

Samsung; Random Access in NR—Flexible UE Bandwidth Aspects; 3GPP TSG-RAN WG2 Meeting #97bis; R2-1702890; Apr. 3-7, 2017; Spokane, USA.

OPPO; HARQ operation in NR; 3GPP TSG-RAN2 #97bis; R2-1702544; Apr. 3-7, 2017; Spokane, USA.

* cited by examiner

[Fig. 1]
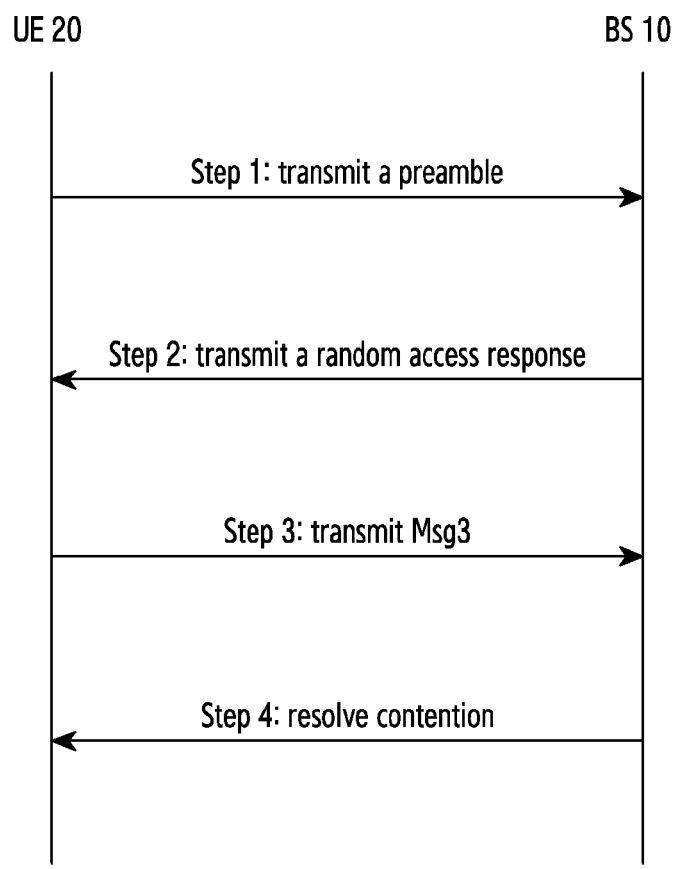

[Fig. 2]
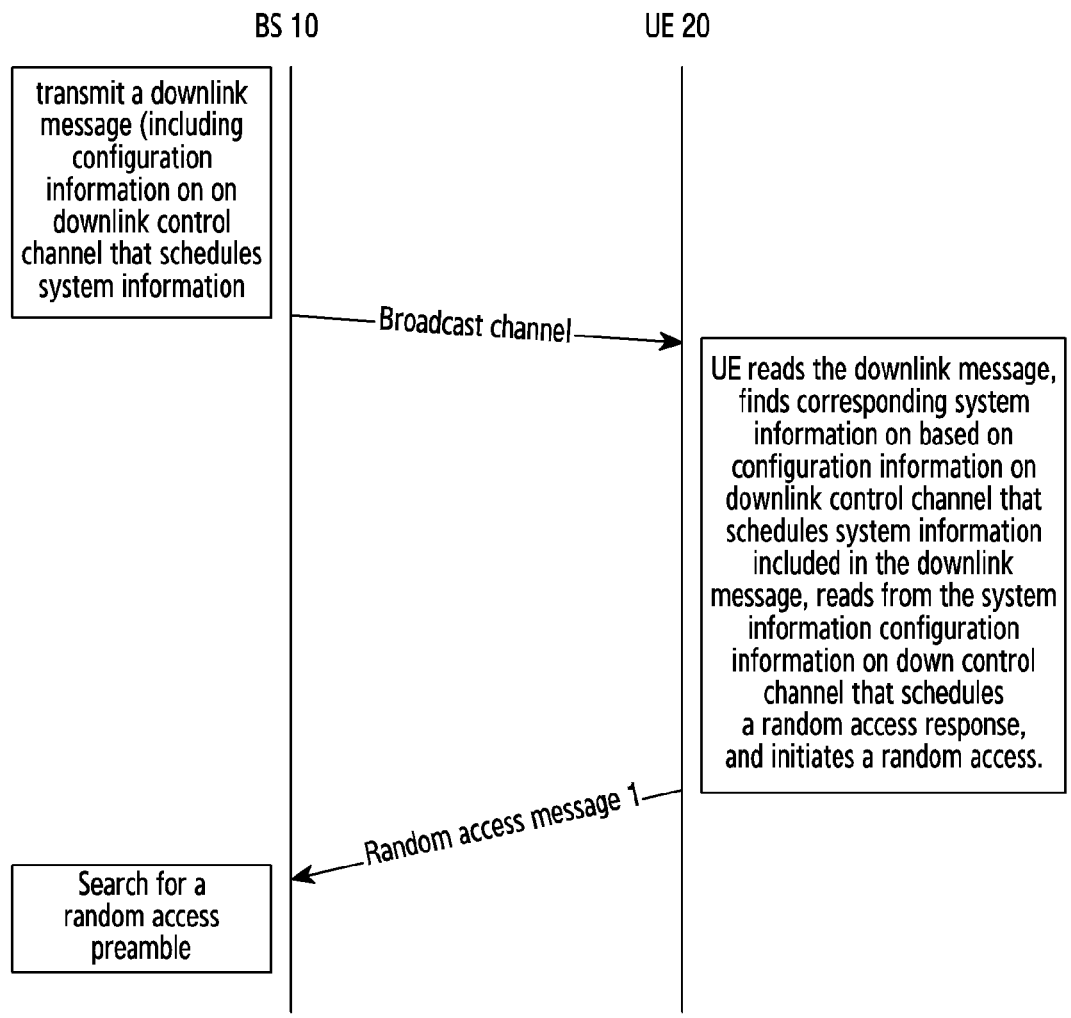

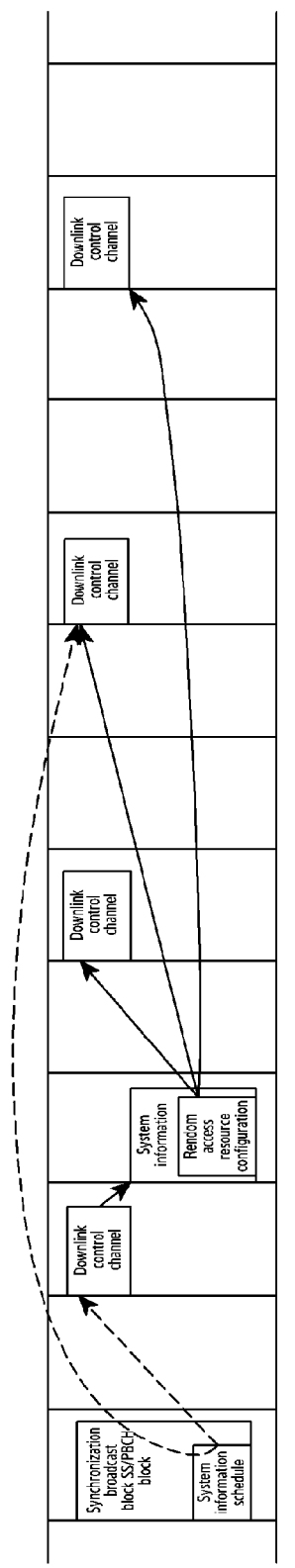
[Fig. 3]

[Fig. 4]
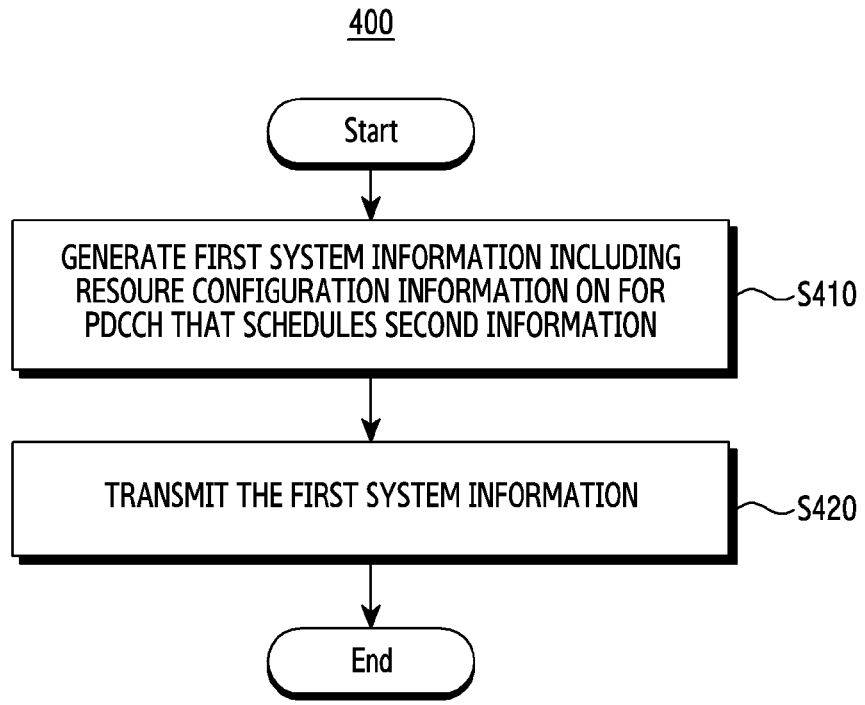
[Fig. 5]
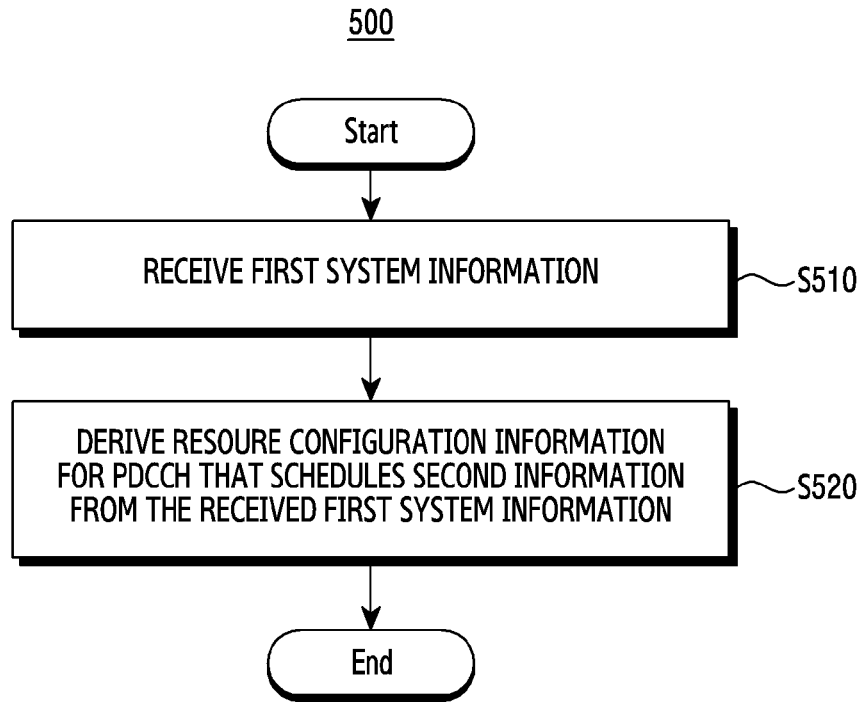

[Fig. 6]
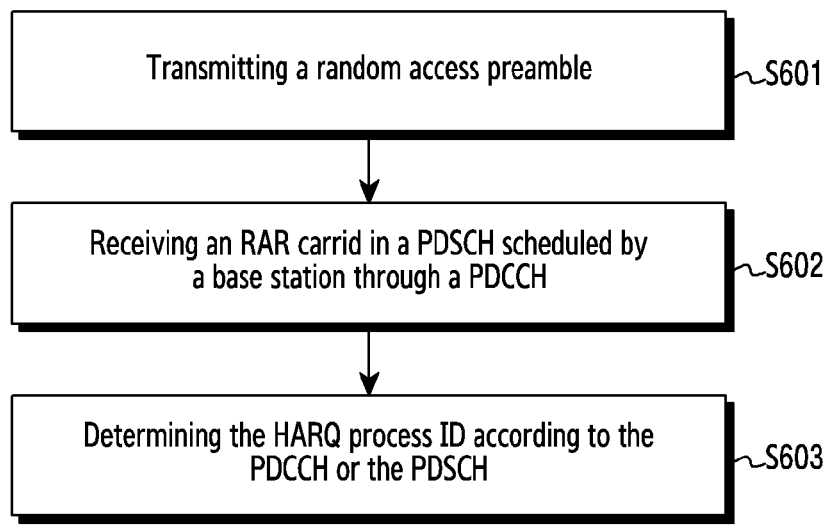
[Fig. 7]
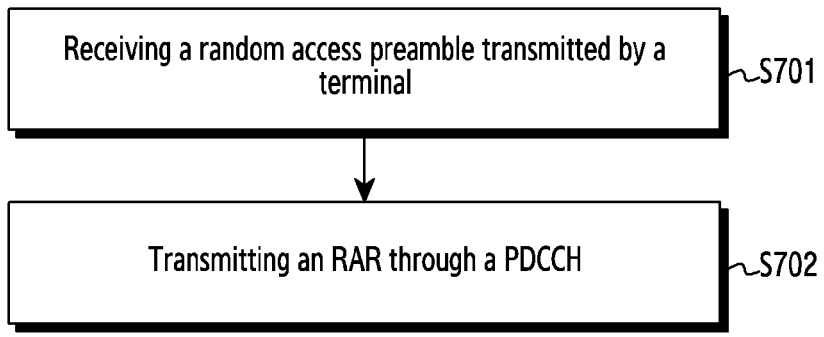

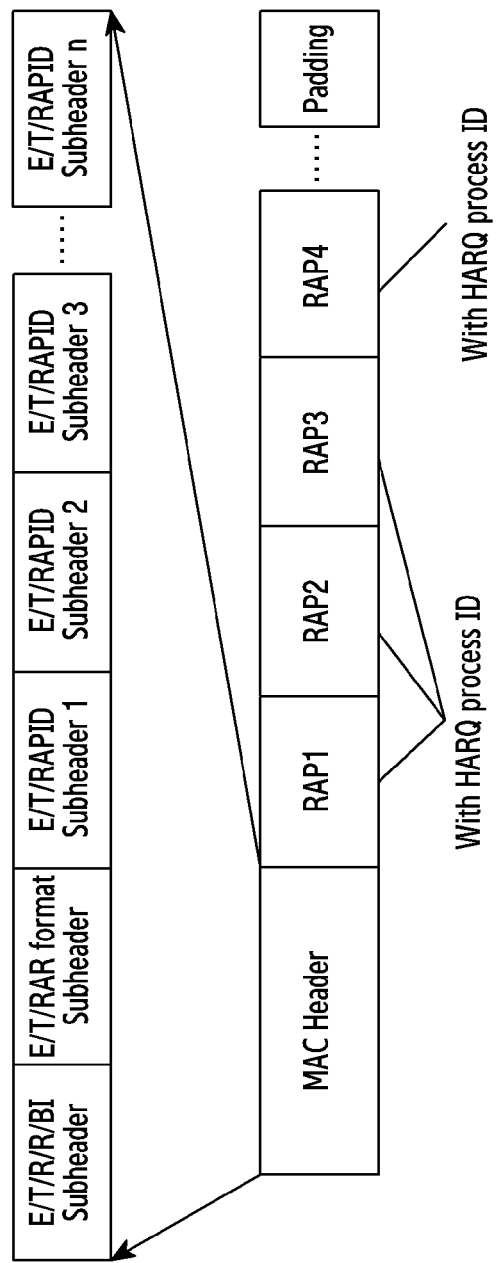
[Fig. 8]

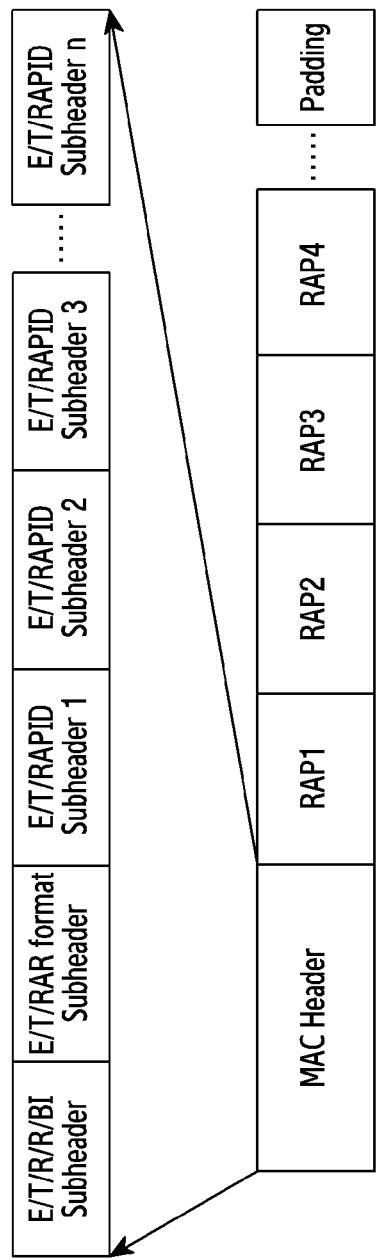
[Fig. 9]

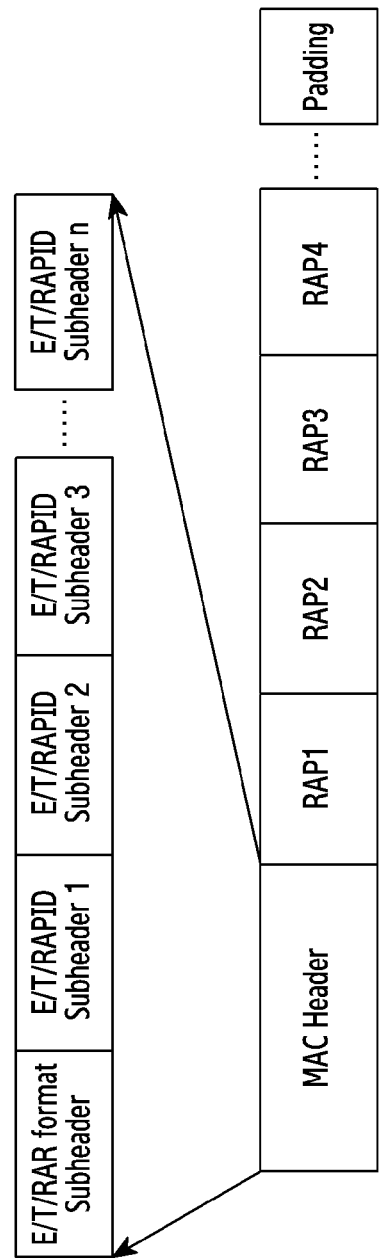
[Fig. 10]

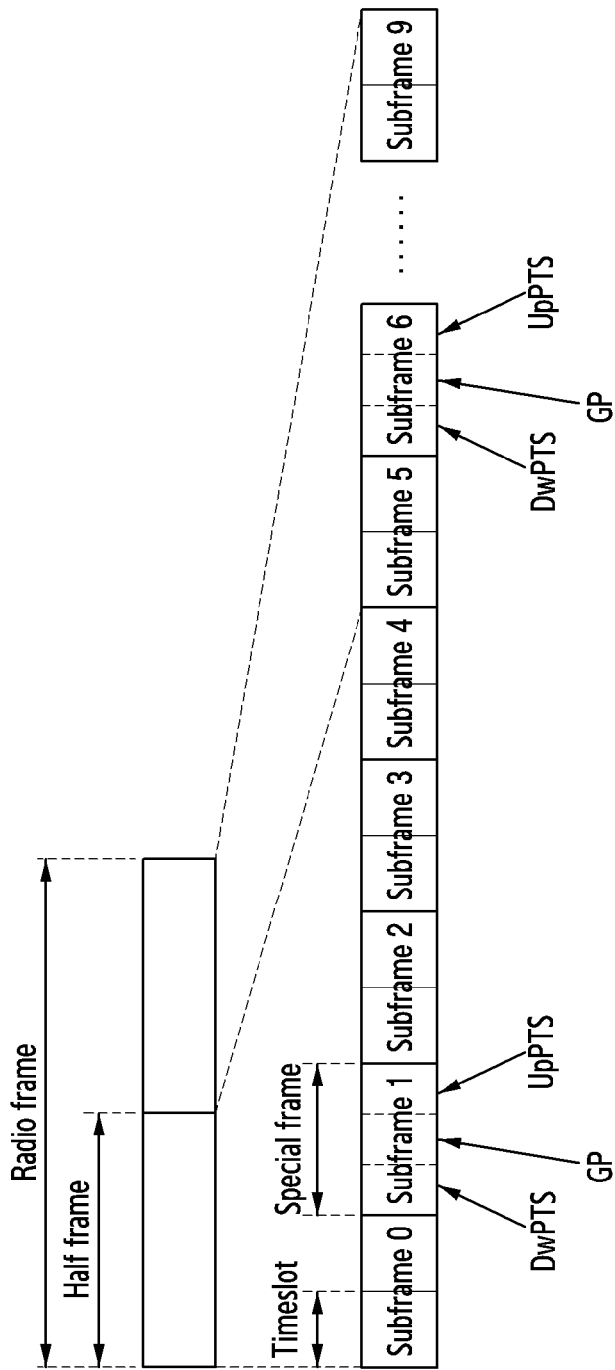
[Fig. 11]

[Fig. 12]
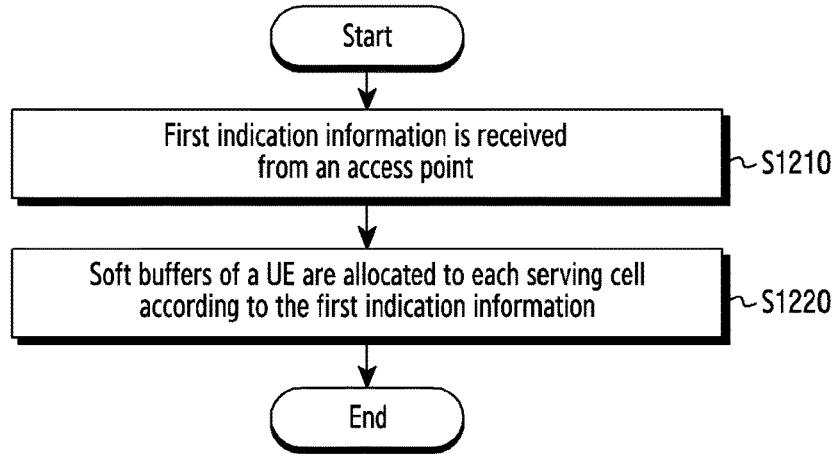
[Fig. 13]
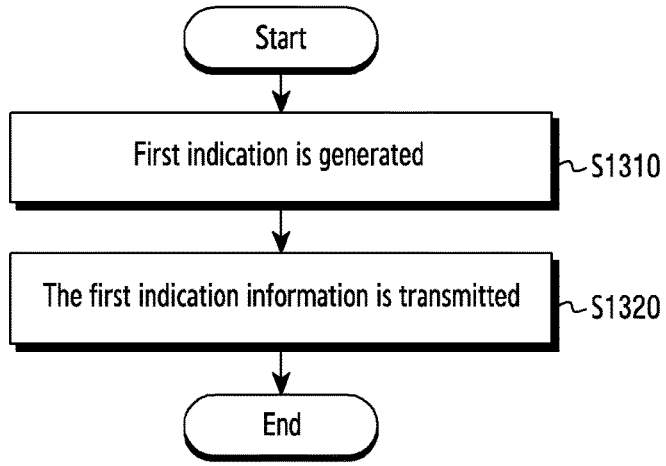
[Fig. 14]
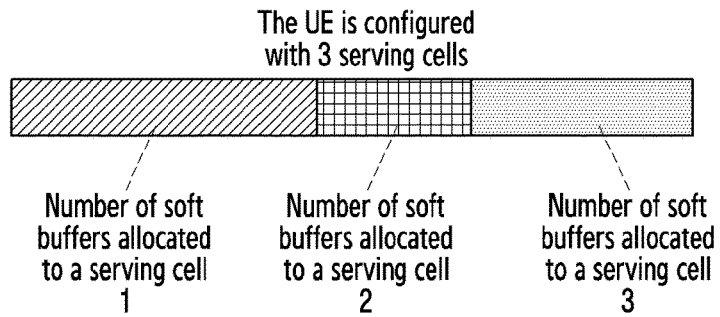
[Fig. 15]
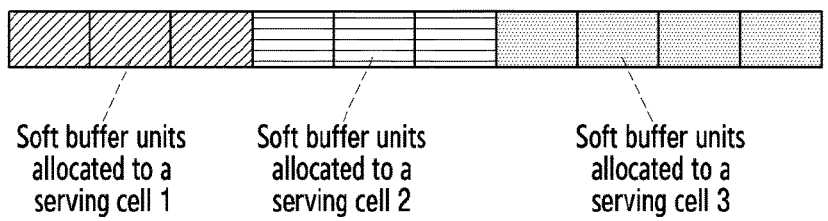

[Fig. 16]
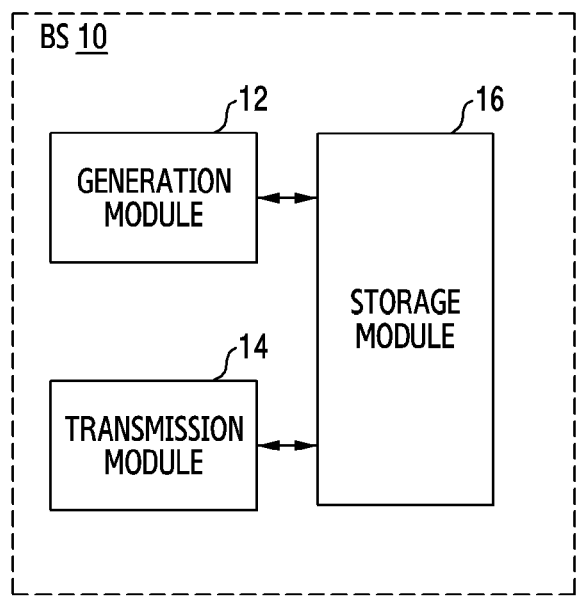
[Fig. 17]
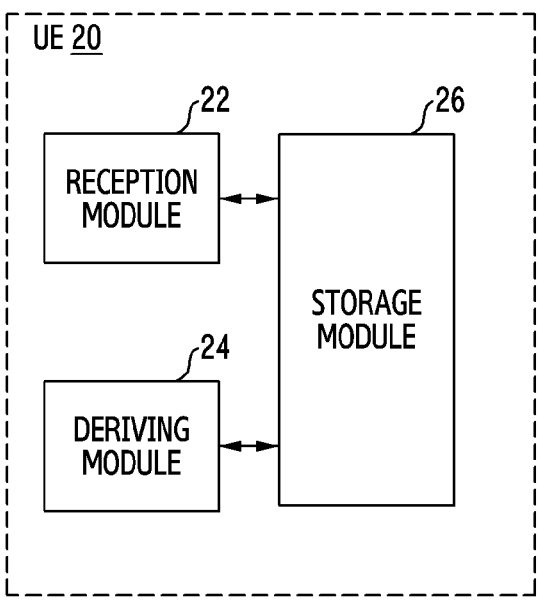

[Fig. 18]
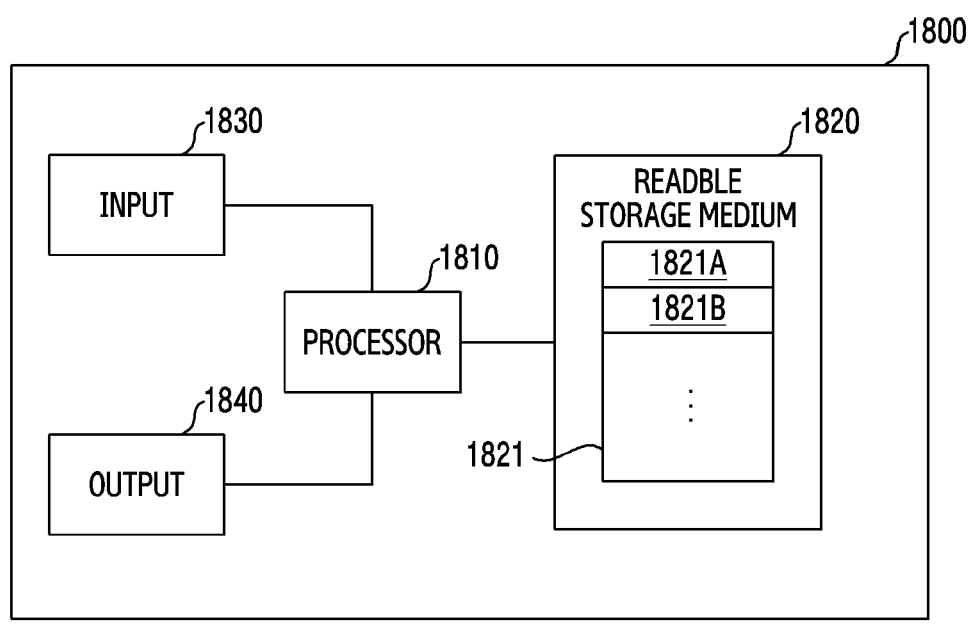

APPARATUS AND METHOD FOR CONFIGURING CHANNEL RESOURCE IN WIRELESS COMMUNICATION SYSTEM

TECHNICAL FIELD

The present disclosure relates to the field of wireless communications technology, and in particular, to an apparatus and a method for configuring channel resources in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the rapid development of the information industry, especially the increased demand from the mobile Internet and Internet of Things (IoT), it will bring challenges to the future of mobile communications technology. According to the report ITU-R M.[IMT.BEYOND 2020.TRAFFIC] of the International Telecommunication Union ITU, it can be expected that by 2020, the growth of mobile traffic will increase by nearly 1,000 times compared to 2010 (4G generation), and the number of connected user equipment will also increase to exceed 17 billion. As the vast number of IoT devices gradually develop into the mobile communications network, the number of connected devices will be even more striking. In response to the unprecedented challenge, the communications industry and academia have launched ingoing 5th generation mobile communications technology research (5G) for the 2020's. Currently in the ITU report ITU-R M.[IMT.VISION], the future 5G framework and overall objectives have already been discussed. The 5G demand outlook, application scenarios, and various important performance indicators are described in detail. In response to new requirements in 5G, the ITU report ITU-R M.[IMT.FUTURE TECHNOLOGY TRENDS] provides information on 5G technology trends, aiming to solve the significant increase in system throughput, user experience consistency, and scalability, to solve significant issues such as IoT, latency, energy efficiency, cost, network flexibility, support for emerging services, and flexible spectrum utilization.

The performance of a random access process directly affects the user's experience. In the conventional wireless communications system, e.g., LTE and LTE-Advanced, a random access process is applied for various scenarios such as establishment of an initial attachment, a cell handover, re-establishment of an uplink connection, RRC reconnection, and may be divided to a Contention-based Random Access and a Contention-free Random Access based on whether a user exclusively occupy the preamble resource. In the contention-based random access, a plurality of users attempt to establish an uplink connection, and select a preamble from the same preamble resource, which may result in a case where more than one user selects the same preamble to transmit to the base station. Therefore, a contention resolution mechanism is the focus of the research of the random access, including for example how to reduce the conflict possibility, and how to quickly resolve conflict that has occurred, which are important indicators of performance of the random access.

FIG. 1 is a diagram illustrating a flow chart of a conventional Contention-based Random Access process by taking LTE-A as an example. The Contention-based Random Access process in LTE-A comprises the following four steps. In Step 1, a user equipment randomly selects one from a pool of preambles, and transmits to the base station a random access message 1 (Msg1), including the selected preamble. The base station performs correlation processing on the received message to identify the preamble transmitted from the user equipment. In Step 2, the base station transmits to the user equipment a random access message 2 (Msg2), i.e., Random Access Response, referred to as RAR for short. The RAR includes a random access preamble identifier, a timing advance determined based on an estimation of a delay between the user equipment and the base station, a temporary Cell-Radio Network Temporary Identifier, referred to as C-RNTI for short, and a time-frequency resource allocated for a next uplink transmission of the user equipment. In Step 3, the user equipment transmits to the base station a random access message 3 (Msg3) based on information included in the received RAR. The Msg3 includes a user terminal identity, an RRC connection request, and others. The user terminal identity is unique to the user and used for resolving a possible conflict. In Step 4, the base station transmits to the user equipment a random access contention resolution message (Msg4), which includes a contention resolution identifier. The contention resolution identifier includes a user terminal identity of a user equipment who wins in the contention resolution. The user equipment detects in the received contention resolution identifier. The user equipment updates the temporary C-RNTI to C-RNTI if its identity is detected, and transmits an ACK to the base station to complete the random access process and wait for scheduling of the base station. Otherwise, the user equipment starts a new random access process after a period of time.

Regarding a Contention-free Random Access process, the base station has knowledge on the user identity, and thus will allocate a preamble to the user. Therefore, there is no need for the user to randomly select a preamble before transmitting the preamble, and will use the allocated preamble instead. The base station transmits a corresponding random access response upon detection of an allocated preamble, including a timing advance, uplink resource allocation, and others. The user equipment receives the random access response, believes the random access process is completed and then waits for further scheduling of the base station. The Contention-free Random Access process thus includes only two steps, i.e., step 1 of transmitting, from the UE to the base station a preamble (Msg1), and step 2 of transmitting, from the base station to the UE a random access response (Msg2).

The random access process in LTE is applicable to scenarios including:
  1. an initial access in RRC_IDLE;
  2. re-establishment of a RRC connection;
  3. a cell handover;
  4. a case where downlink data arrives and requests for a random access process in RRC connection (when the uplink is not in synchronization);
  5. a case where uplink data arrives and requests for a random access process in RRC connection (when the uplink is not in synchronization or no resource is allocated for a scheduling request in Physical Uplink Control Channel (PUCCH) resource); and
  6. positioning.

In LTE, the same random access steps are adopted in the above six scenarios. As said above, the user equipment needs to receive the random access response transmitted from the base station in no matter a Contention-based Random Access process or a Contention-free Random Access process. LTE specifies that Physical Downlink Control Channel (PDCCH) is used to transmit scheduling information for the random access messages. Therefore, the user equipment needs to be informed of a resource configuration for PDCCH to monitor, so as to monitor PDCCH that schedules the random access response.

In the up-to-date communication system, Physical Broadcast Channel (PBCH) has a periodicity that may be the same as that of other system information, for example SIB1, or different from that of other system information. For example, the periodicity of PBCH may be up to 80 ms, or even to 160 ms, and thus the periodicity of system information corresponding to each PBCH also may be up to 80 ms, or even to 160 ms. Such periodicity may be too long to other information, such as random access related information, paging information and other system information. For example, a user that accesses randomly may perform a random access process every 5 ms or 10 ms to monitor a random access response (Msg2).

Therefore, the base station needs to configure control channel resource for information such as random access related information, paging information and other system information.

DISCLOSURE OF INVENTION

Solution to Problem

Embodiments of the present disclosure propose configuring control channel resource for scheduling information such as random access related information, paging information and other system information in specified system information, for at least partly solving some of the above problems. The configuration of the control channel resource may be implemented in many ways. One way is to establish a relation to a resource configuration for a control channel that schedules the specified system information, so as to configure control channel resource for information such as random access related information, paging information and other system information. The second way is to inform the exact resource configuration for a control channel that schedules information such as random access related information and others. For example, it may indicate by a time-frequency shift with respect to a reference time-frequency position, or a separate complete resource indicator. Alternatively, it may also use a combination of the two ways.

A first aspect of the present disclosure provides a method for configuring channel resource, comprising receiving first system information, and deriving resource configuration information for PDCCH that schedules second information from the received first system information.

A second aspect of the present disclosure provides a method for configuring channel resource, comprising generating first system information, the first system information including resource configuration information for PDCCH that schedules second information, and transmitting the first system information.

A third aspect of the present disclosure provides a user equipment, comprising a reception module configured to receive first system information, and a deriving module configured to derive resource configuration information for PDCCH that schedules second information from the received first system information.

A fourth aspect of the present disclosure provides a base station comprising a generating module configured to generate first system information, the first system information including resource configuration information for PDCCH that schedules second information, and a transmitting module configured to transmit the first system information.

A fifth aspect of the present disclosure provides a user equipment comprising a processor and a memory with machine readable instruction stored thereon, which when executed on the processor, causes the processor to implement the method according to the first aspect.

A sixth aspect of the present disclosure provides a base station comprising a processor and a memory with machine readable instruction stored thereon, which when executed on the processor, causes the processor to implement the method according to the second aspect.

A seventh aspect of the present disclosure provides a non-transitory storage medium with machine readable instruction stored thereon, which when executed on a machine, causes the machine to implement the method according to the first or second aspect.

An eighth aspect of the present disclosure provided a computer program including computer executable instructions, which when executed on a machine, causes the machine to implement the method according to the first or second aspect.

In some embodiments, the second information is at least one of:
  a random access response;
  a random access contention resolution message;
  re-transmitted random access message 3;
  paging message; and
  second system information.

In some embodiment, the resource configuration information for PDCCH that schedules second information comprises at least one of:
  information indicating a resource start position to monitor PDCCH that schedules second information;
  information indicating a resource size to monitor PDCCH that schedules second information; and
  information indicating a periodicity to monitor PDCCH that schedules second information.

In some embodiment, the resource configuration information for PDCCH that schedules second information is configured by establishing a relation to a resource configuration for PDCCH that schedules the first system information.

In some embodiment, the resource configuration information for PDCCH that schedules second information comprises first indication information that indicates whether the resource configuration information for PDCCH that schedules second information is the same as resource configuration information for PDCCH that schedules the first system information.

In some embodiment, the resource configuration information for PDCCH that schedules second information comprises second indication information on an offset between the resource configuration information for PDCCH that schedules second information and the resource configuration information for PDCCH that schedules the first system information.

In some embodiment, the resource configuration information for PDCCH that schedules second information is configured separately from a resource configuration for PDCCH that schedules the first system information.

In some embodiment, the resource configuration information for PDCCH that schedules second information is used together with a look-up table to determine a resource configuration for PDCCH that schedules second information.

In some embodiment, the resource configuration information for PDCCH that schedules second information is used together with a reference value to determine a resource configuration for PDCCH that schedules second information.

BRIEF DESCRIPTION OF DRAWINGS

The above and other features of the present invention will become more apparent from the following detailed description taken in conjunction with the accompanying drawings, in which:

FIG. 1 is a diagram illustrating a flow chart of a conventional Contention-based Random Access process;

FIG. 2 is a diagram illustrating a flow chart of obtaining by the UE configuration information of PDCCH that schedules a random access response according to an embodiment of the present disclosure;

FIG. 3 is a diagram showing that a Synchronization broadcast block has a periodicity different from that of system information;

FIG. 4 is a flow chart showing a method for configuring channel resource according to an embodiment of the present disclosure;

FIG. 5 is a diagram showing a method for configuring channel resource according to an embodiment of the present disclosure;

FIG. 6 is a schematic flowchart of a method for configuring an HARQ process ID on a terminal side according to the present disclosure;

FIG. 7 is a schematic flowchart of a method for configuring an HARQ process ID on a base station side according to the present disclosure;

FIG. 8 is a first exemplary diagram of an MAC header in an RAR adding an RAR format indication;

FIG. 9 is a second exemplary diagram of an MAC header in an RAR adding an RAR format indication;

FIG. 10 is a third exemplary diagram of an MAC header in an RAR adding an RAR format indication;

FIG. 11 is a diagram of a frame structure of a TDD system in the LTE;

FIG. 12 is an exemplary flowchart of a method for allocating soft buffers of a UE according to an embodiment of the present disclosure;

FIG. 13 is an exemplary flowchart of another method for allocating soft buffers of a UE according to an embodiment of the present disclosure;

FIG. 14 is a diagram of allocation of soft buffers according to an embodiment of the present disclosure;

FIG. 15 is another diagram of allocation of soft buffers according to an embodiment of the present disclosure;

FIG. 16 is a block diagram showing a structure of a base station according to an embodiment of the present disclosure;

FIG. 17 is a block diagram showing a structure of a user equipment according to an embodiment of the present disclosure; and FIG. 18 is a block diagram showing a computer system that can be implemented as a base station or a user equipment according to an embodiment of the present disclosure.

In the drawings, the same or similar elements are identified by the same or similar reference numerals.

BEST MODE FOR CARRYING OUT THE INVENTION

The idea for notifying a resource configuration for a control channel for random access and the like and the corresponding base station and user equipment will be described in detail below with reference to the accompanying drawings and specific embodiments.

It should be noted that the present disclosure should not be limited to the specific embodiments described below. In addition, detailed descriptions of well-known technologies that are not directly related to the present disclosure are omitted for brevity in order to avoid obscuring the understanding of the present invention.

In embodiments herein, the terms "base station," "access point" and "access node" can be used interchangeably, and the terms "terminal," "terminal device," "user equipment", and the like can be used interchangeably, unless explicitly indicated.

The present disclosure provides a method for configuring channel resource, comprising generating first system information, the first system information including resource configuration information for PDCCH that schedules second information, and transmitting the first system information.

The present disclosure will be described in detail below by taking configuring control channel resource of a random access response as an example. It should be understood that the present disclosure is also applicable to configure control channel resource of other random access related message, for example a random access contention resolution message, a re-transmitted random access message 3, a paging message and other system information.

As said above, in a new communication system such as a 5G standard compliant system, a scheduling periodicity of some information may be different from that of the Physical Broadcast Channel (PBCH), and thus it needs to configure control channel resource for such information.

in view of this, embodiments of the present disclosure provides a method for configuring resources for a downlink control channel. The downlink control channel may be used to schedule messages including, for example:

1. random access response (Msg2);
2. random access contention resolution message (Msg4);
3. re-transmitted random access message (Msg3);

4. Paging information; and

5. Other System Information, referred to as OSI for short, including system information that has a periodicity different from that of PBCH.

For the above information, embodiments of the present disclosure proposes configuring resource configuration information for a control channel for scheduling the information in specified system information, and provides many ways for configuring. One way is to establish a relation to a resource configuration for a control channel that schedules the specified system information, to indicate a resource configuration for a control channel that schedules the information. For example, it may use the same time-frequency resource start position, a resource size, but different periodicity. The second way is to inform the exact resource configuration for a control channel that schedules the information. For example, it may indicate by a time-frequency shift with respect to a reference time-frequency position, or a separate complete resource indicator. alternatively, it may also use a combination of the two ways.

The present disclosure will be described in detail in the following embodiments by taking a random access response as an example. It should be understood that it is for illustration only but not for limitation. The idea of the present disclosure is also applicable to other objects, for example configuring control channel resource of a random access contention resolution message, a re-transmitted random access message 3, a paging message and other system information.

FIG. 2 is a diagram illustrating a flow chart of obtaining by the UE configuration information of PDCCH that schedules a random access response (Msg2) according to an embodiment of the present disclosure.

in the embodiment of the present disclosure, the UE reads configuration information of PDCCH (denoted by PDCCH_SI) that schedules system information in a downlink message (e.g., Physical Broadcast Channel (PBCH) message) transmitted from the base station, so as to obtain position information to monitor PDCCH_SI, for example a start position (denoted by TF_pdcch_si), a size (denoted by Size_pdcch_si), and a periodicity (denoted by Periodicity_pdcch_si) to monitor PDCCH_SI. The UE then obtains scheduling information of the system information by monitoring PDCCH_SI carried at the position. The UE then reads the system information from the Downlink Share Channel (PDSCH) based on the obtained scheduling information of the system information, and obtains information on a resource configuration for PDCCH (denoted by PDCCH_Msg2) that schedules the random access response (Msg2) from the system information. The information on a resource configuration for PDCCH_Msg2 may indicate the start position (denoted by TF_pdcch_msg2), a resource size (denoted by Size_pdcch_msg2) and/or a periodicity to monitor PDCCH_Msg2 (denoted by Periodicity_pdcch_msg2). In the messages:

1. TF_pdcch_msg2 may be the same as, or different from TF_pdcch_si;

2. Size_pdcch_msg may be the same as, or different from Size_pdcch_si; or

3. Periodicity_pdcch_msg2 may be the same as, or different from Periodicity_pdcch_si.

Generally the value of Periodicity_pdcch_msg2 may be configured separately.

For example, as shown in FIG. 3, the synchronization broadcast block is configured with a periodicity different from that of the system information. In particular, as shown in FIG. 3, Periodicity_pdcch_si configured in the synchronization broadcast block is Periodicity_pdcch_si=2*Periodicity_pdcch_msg2. The other resource information, for example the start position and resource size of PDCCH_Msg2 are the same as the start position and resource size of PDCCH_SI.

In particular, the above parameters TF_pdcch_si, Size_pdcch_si, Periodicity_pdcch_si, TF_pdcch_msg2, Size_pdcch_msg and/or Periodicity_pdcch_msg2 may be configured with default values defined in the system, or fixed values. There is no need for notifying parameters that are configured with default values defined in the system or fixed values in the broadcast channel (PBCH) or system information. For example, TF_pdcch_si, Size_pdcch_si and/or Periodicity_pdcch_si may be fixed in the standard in advance, or use default values. If the system specifies that TF_pdcch_si is at the $1^{st}$ PRB of the sixth OFDM symbol in the slot in which the SS block is located, there is no need for notifying TF_pdcch_si, and only Size_pdcch_si and Periodicity_pdcch_si shall be notified. For example, Size_pdcch_si=16 Control channel elements (referred to as CCE for short), which is comprised of a fixed number of Resource Element (referred to as RE for short), and Periodicity_pdcch_si=20 ms. Similarly, TF_pdcch_msg2, Size_pdcch_msg and/or Periodicity_pdcch_msg2 may be fixed in the standard in advance, or use default values, and there is no need for notifying the parameters accordingly.

After the UE has obtained information on a resource configuration for PDCCH that schedules a random access response (Msg2), it selects random access time-frequency resource and a preamble, and then is ready to transmit a random access massage 1 including the preamble selected by the UE.

How to configure the control channel resource for information such as random access related messages, paging information, or other system information is described below with reference to FIG. 4 to FIG. 5.

FIG. 4 is a flow chart showing a method 400 for configuring channel resource according to an embodiment of the present disclosure. The method is a method of transmitting a resource configuration for PDCCH that schedules a random access response performed at a base station.

In step S410, the base station generates first system information. The first system information includes information on a resource configuration for PDCCH that schedules second information, i.e., a random access response.

In step S420, the base station transmits the generated first system information.

Alternatively, the first system information is system information having a periodicity same as that of PBCH (for example, SIB1).

Alternatively, the second information may be one of: random access related information, paging information or other system information. The random access related information may be for example a random access response, a random access contention resolution message, re-transmitted random access message 3, and the like.

The resource configuration information for PDCCH that schedules second information comprises at least one of:

information indicating a resource start position to monitor PDCCH that schedules second information;

information indicating a resource size to monitor PDCCH that schedules second information; and information indicating a periodicity to monitor PDCCH that schedules second information.

The following describes configuring the control channel resource for a random access response as an example. In the example, the resource configuration information for PDCCH that schedules second information may be resource configuration information for PDCCH that schedules a random access response.

The resource configuration information for PDCCH that schedules a random access response may comprise at least one of:

information indicating a resource start position to monitor PDCCH that schedules a random access response (for example, TF_pdcch_msg2);

information indicating a resource size to monitor PDCCH that schedules a random access response (for example, Size_pdcch_msg2); and information indicating a periodicity to monitor PDCCH that schedules a random access response (for example, Periodicity_pdcch_msg2).

In the system information, the resource configuration information for PDCCH (PDCCH_Msg2) that schedules a random access response may be configured in many ways. For example, it may be configured by establishing a relation to the resource configuration for PDCCH_SI, or configured separately from the resource configuration for PDCCH_SI, or in a way by combining the two ways.

The above three types of indication information will be described below in detail.

A Configuring a start position to monitor PDCCH (PDCCH_Msg2) that schedules a random access response (TF_pdcch_msg2)

The first way: TF_pdcch_msg2 is configured by establishing a relation to TF_pdcch_si.

In particular, TF_pdcch_msg2 may include a 1-bit flag. The flag indicates whether TF_pdcch_msg2 has the same value as that of TF_pdcch_si (for example, indicated in PBCH or default in system). For example, "1" indicates that TF_pdcch_msg2 is the same as TF_pdcch_si, while "0" indicates that TF_pdcch_msg2 is different from TF_pdcch_si. What shall be understood is that "1" and "0" merely indicate different values herein and the meaning denoted thereby may be exchanged. For example, "0" indicates that TF_pdcch_msg2 is the same as TF_pdcch_si, while "1" indicates that TF_pdcch_msg2 is different from TF_pdcch_si.

In addition or alternatively, TF_pdcch_msg2 may include an offset with respect to TF_pdcch_si (TF_offset). The TF_offset may include:

1. a time-domain offset, indicating an offset in time domain of TF_pdcch_msg2 with respect to TF_pdcch_si. For example, when the time-domain offset indicates an increment of 1 symbol and TF_pdcch_si indicates the sixth OFDM system in time domain, TF_pdcch_msg2 indicates the seventh OFDM system in time domain.

2. a frequency-domain offset, indicating an offset in frequency domain of TF_pdcch_msg2 with respect to TF_pdcch_si. For example, when the frequency-domain offset indicates an increment of 1 PRB and TF_pdcch_si indicates the first PRB in frequency domain, TF_pdcch_msg2 indicates the second PRB in frequency domain.

What shall be understood is that TF_pdcch_msg2 may include only an offset of TF_pdcch_msg2 with respect to TF_pdcch_si (TF_offset) without the 1-bit flag indicating whether TF_pdcch_msg2 has the same resource configuration as that of TF_pdcch_si, or include the both (for example, when the 1-bit flag indicates that TF_pdcch_msg2 is different from TF_pdcch_si).

The second way: Configuring time-frequency position of TF_pdcch_msg2 separately

In particular, TF_pdcch_msg2 may include independent information indicating the time-domain position and information indicating the frequency-domain position. For example, TF_pdcch_msg2 may include information indicating the seventh OFDM system in time domain and the second PRB in frequency domain.

The third way: combination of the above two ways

In particular, TF_pdcch_msg2 may include a 1-bit flag indicating whether TF_pdcch_msg2 has the same value as that of TF_pdcch_si, and also independent information indicating the time-frequency position of TF_pdcch_msg2 when the 1-bit flag indicates that TF_pdcch_msg2 is different from TF_pdcch_si.

Alternatively, regarding the above three ways. when a plurality of frequency bands are configured in the system, PDCCH may be located at different frequency bands, and information indicating the frequency-domain position included in TF_pdcch_msg2 may include information indicating the frequency band and information indicating the frequency-domain position in the frequency band.

In the first way, the information indicating the frequency band and the information indicating the frequency-domain position in the frequency band included in TF_pdcch_msg2 may include a 1-bit flag indicating whether it is the same as that of TF_pdcch_si, respectively. For example, a flag "1" indicates that they are the same, "0" indicates that they are different.

In addition or alternatively, the information indicating the frequency band included in TF_pdcch_msg2 may indicate an offset of the frequency band, indicating an offset with respect to the frequency band of TF_pdcch_si. The information indicating the frequency-domain position in the frequency band included in TF_pdcch_msg2 may include an offset of the frequency-domain position in the frequency band, indicating an offset with respect to the frequency-domain position of TF_pdcch_si in the frequency band. As an example, it is assumed that PDCCH_SI starts from the third PRB and is in frequency band 1, and PDCCH_Msg2 starts from the fifth PRB and is in frequency band 3. The offset of the frequency band of TF_pdcch_msg2 indicates an increment of 3−1=2 frequency bands, and the offset of the frequency-domain position in the frequency band of TF_pdcch_msg2 indicates an increment of 5−3=2 PRBs.

In the second way, the information indicating the frequency band and the information indicating the frequency-domain position in the frequency band included in TF_pdcch_msg2 may be informed separately. With reference to the above example, if PDCCH_Msg2 starts from the fifth PRB and is in frequency band 3, the information indicating the frequency band included in TF_pdcch_msg2 may indicate frequency band 3, and information indicating the frequency-domain position in the frequency band included in TF_pdcch_msg2 may indicate the fifth PRB.

In the third way, the information indicating the frequency band and the information indicating the frequency-domain position in the frequency band included in TF_pdcch_msg2 may include a 1-bit flag indicating whether TF_pdcch_msg2 has the same value as that of TF_pdcch_si, respectively, and also independent information indicating the frequency band and/or information indicating the frequency-domain position in the frequency band of TF_pdcch_msg2 when the 1-bit flag indicates that the frequency band of TF_pdcch_msg2 is different from that of TF_pdcch_si and/or the frequency-domain start position in the frequency band of TF_pdcch_msg2 is different from that of TF_pdcch_si.

What shall be understood is that TF_pdcch_msg2 (including the first way of establishing a relation and the second way of configuring separately) may be informed by using a look-up table or a relation to a reference value, which is similar to the following description and will not be elaborated herein.

B Configuring a resource size to monitor PDCCH (PDCCH_Msg2) that schedules a random access response (Size_pdcch_msg2)

The first way: Size_pdcch_msg2 is configured by establishing a relation to Size_pdcch_si.

In particular, Size_pdcch_msg2 may include a 1-bit flag. The flag indicates whether Size_pdcch_msg2 has the same value as that of Size_pdcch_si (for example, indicated in PBCH or default in system). For example, "1" indicates that Size_pdcch_msg2 is the same as Size_pdcch_si, while "0" indicates that Size_pdcch_msg2 is different from Size_pdcch_si.

In addition or alternatively, Size_pdcch_msg2 may include an offset with respect to Size_pdcch_si (Size_offset). Size_offset may be indicated in many ways.

For example, Size_offset may have a value exactly equal to the offset between Size_pdcch_msg2 and Size_pdcch_si, for example the incremental number of CCEs.

As another example, it may specify a correspondence between the value of Size_offset and the offset of the resource sizes in a look-up table or in a predefined way. For example, a 2-bit Size_pdcch_msg2 may indicate four offsets of the resource sizes, as shown in Table 1.

TABLE 1 example of indicating by Size_offset an incremental offset with respect to Size_pdcch_si in a look-up table

| Size_pdcch_msg2 | Number of CCE |
|---|---|
| 00 | 8 |
| 01 | 16 |
| 10 | 32 |
| 11 | 64 |

As another example, with a reference value being informed or pre-defined, Size_offset indicates a relation to the reference value. For example, the reference value indicates 8 CCEs, and Size_offset indicates the times of the reference value. For example, a 2-bit Size_offset with a value of "1," "2," "3," and "4" indicates that Size_pdcch_msg2 is incremented by 8, 16, 24 and 32 CCEs with respect to Size_pdcch_si, respectively.

For example, Size_offset indicates an increment of 16 CCEs with respect to Size_pdcch_Si and Size_pdcch_SI=16 CCEs, Size_pdcch_msg2=32 CCEs.

What shall be understood is that Size_pdcch_msg2 may include only an offset of Size_pdcch_msg2 with respect to Size_pdcch_si (Size_offset) without the 1-bit flag indicating whether Size_pdcch_msg2 has the same resource configuration as that of Size_pdcch_si, or include the both (for example, when the 1-bit flag indicates that Size_pdcch_msg2 is different from Size_pdcch_si).

The second way: Configuring resource size of Size_pdcch_msg2 separately

In particular, Size_pdcch_msg2 may directly indicate the number of CCEs indicated by the resource size, for example 32 CCEs. There are many way to indicate the number of CCEs.

For example, Size_pdcch_msg2 may has a value equal to the number of CCEs.

As another example, it may specify a correspondence between the value of Size_pdcch_msg2 and the number of CCEs in a look-up table or in a predefined way. For example, a 2-bit Size_pdcch_msg2 may indicate four numbers of CCEs, as shown in Table 2.

TABLE 2 example of indicating the number of CCEs in a look-up table

| Size_pdcch_msg2 | Number of CCEs |
|---|---|
| 00 | 8 |
| 01 | 16 |
| 10 | 32 |
| 11 | 64 |

As another example, with a reference value being informed or pre-defined, Size_pdcch_msg2 indicates a relation to the reference value. For example, the reference value indicates 8 CCEs, and Size_pdcch_msg2 indicates the times of the reference value. For example, a 2-bit Size_offset with a value of "1," "2," "3," and "4" indicates 8, 16, 24 and 32 CCEs, respectively.

The third way: combination of the above two ways

In particular, Size_pdcch_msg2 may include a 1-bit flag indicating whether Size_pdcch_msg2 has the same value as that of Size_pdcch_si, and also independent information indicating the resource size of Size_pdcch_msg2 when the 1-bit flag indicates that Size_pdcch_msg2 is different from Size_pdcch_si.

C Configuring a periodicity to monitor PDCCH (PDCCH_Msg2) that schedules a random access response (Periodicity_pdcch_msg2)

The first way: Periodicity_pdcch_msg2 is configured by establishing a relation to Periodicity_pdcch_si.

In particular, Periodicity_pdcch_msg2 may include a 1-bit flag. The flag indicates whether Periodicity_pdcch_msg2 has the same value as that of Periodicity_pdcch_si (for example, indicated in PBCH or default in system). For example, "1" indicates that Periodicity_pdcch_msg2 is the same as Periodicity_pdcch_si, while "0" indicates that Periodicity_pdcch_msg2 is different from Periodicity_pdcch_si.

In addition or alternatively, Periodicity_pdcch_msg2 may include an offset with respect to Periodicity_pdcch_si (Periodicity_offset). For example, Periodicity_offset may indicate a half of Periodicity_pdcch_SI. If Periodicity_pdcch_SI=20 ms, Periodicity_pdcch_msg2=10 ms. Periodicity_pdcch_msg2 may be configured in many ways.

For example, Periodicity_offset may be a offset of Periodicity_pdcch_msg2 to Periodicity_pdcch_si. If Periodicity_offset=N, Periodicity_pdcch_msg2=Periodicity_pdcch_si-N.

As another example, it may specify a correspondence between the value of Periodicity_offset and the offset of the periodicities in a look-up table or in a predefined way. For example, a 2-bit Periodicity_offset may indicate four offsets of the periodicity, as shown in Table 3.

TABLE 3 example of indicating the offset of the periodicity in a look-up table

| Periodicity_pdcch_msg2 | Offset of periodicity |
|---|---|
| 00 | 1/2 |
| 01 | 1/4 |
| 10 | 1/8 |
| 11 | 1/16 |

As another example, with a reference value being informed or pre-defined, Periodicity_offset indicates a relation to the reference value. For example, the reference value indicates 2, and Periodicity_offset indicates the times of the reference value. For example, a 2-bit Periodicity_offset with a value of "1," "2," "3," and "4" indicates that Periodicity_pdcch_msg2=Periodicity_pdcch_si/2M, Periodicity_pdcch_si/4M, Periodicity_pdcch_si/6M, and Periodicity_pdcch_si/8M, respectively.

What shall be understood is that Periodicity_pdcch_msg2 may include only an offset of Periodicity_pdcch_msg2 with respect to Periodicity_pdcch_si (Periodicity_offset) without the 1-bit flag indicating whether Periodicity_pdcch_msg2 has the same resource configuration as that of Periodicity_pdcch_si, or include the both (for example, when the 1-bit flag indicates that Periodicity_pdcch_msg2 is different from Periodicity_pdcch_si).

The second way: Configuring Periodicity_pdcch_msg2 separately

In particular, Periodicity_pdcch_msg2 may indicate an independent periodicity to monitor PDCCH (PDCCH_Msg2) of a random access response. The size of the periodicity may be indicated in many ways.

For example, Periodicity_pdcch_msg2 may have a value equal to the number of milliseconds of the periodicity.

As another example, it may specify a correspondence between the value of Periodicity_pdcch_msg2 and the periodicity in a look-up table or in a predefined way. For example, a 2-bit Periodicity_pdcch_msg2 may indicate four periodicities, as shown in Table 4.

TABLE 4 example of indicating the periodicity in a look-up table

| Periodicity_pdcch_msg2 | Periodicity |
|---|---|
| 00 | 2.5 ms |
| 01 | 5 ms |
| 10 | 10 ms |
| 11 | 20 ms |

As another example, with a reference value being informed or pre-defined, Periodicity_pdcch_msg2 indicates a relation to the reference value. For example, the reference value indicates 2.5 ms, and Periodicity_pdcch_msg2 indicates the times of the reference value. For example, a 2-bit Periodicity_pdcch_msg2 with a value of "1," "2," "3," and "4" indicates 2.5 ms, 5 ms, 7.5 ms, and 10 ms, respectively.

The third way: combination of the above two ways

In particular, Periodicity_pdcch_msg2 may include a 1-bit flag indicating whether Periodicity_pdcch_msg2 has the same value as that of Periodicity_pdcch_is, and also independent information indicating the periodicity Periodicity_pdcch_msg2 when the 1-bit flag indicates that Periodicity_pdcch_msg2 is different from Periodicity_pdcch_si.

FIG. 5 is a diagram showing a method 500 for configuring channel resource according to an embodiment of the present disclosure. The method may be a method of obtaining control channel resource configured for information such as random access related messages, paging information and other system information performed at a user equipment (UE).

In step S510, it receives first system information.

In step S520, it derives resource configuration information for PDCCH that schedules second information from the received first system information.

Alternatively, the first system information is system information having a periodicity same as that of PBCH (for example, SIB1).

Alternatively, the second information may be one of: random access related information, paging information or other system information. The random access related information may be for example a random access response, a random access contention resolution message, re-transmitted random access message 3, and the like.

Alternatively, the resource configuration information for PDCCH that schedules second information comprises at least one of:

information indicating a resource start position to monitor PDCCH that schedules second information;

information indicating a resource size to monitor PDCCH that schedules second information; and information indicating a periodicity to monitor PDCCH that schedules second information.

Alternatively, the resource configuration information for PDCCH that schedules second information is configured by establishing a relation to a resource configuration for PDCCH that schedules the first system information.

Alternatively, the resource configuration information for PDCCH that schedules second information comprises first indication information that indicates whether the resource configuration information for PDCCH that schedules second information is the same as resource configuration information for PDCCH that schedules the first system information.

Alternatively, the resource configuration information for PDCCH that schedules second information comprises second indication information on a offset between the resource configuration information for PDCCH that schedules second information and the resource configuration information for PDCCH that schedules the first system information.

Alternatively, the resource configuration information for PDCCH that schedules second information is configured separately from a resource configuration for PDCCH that schedules the first system information.

Alternatively, the resource configuration information for PDCCH that schedules second information is used together with a look-up table to determine a resource configuration for PDCCH that schedules second information.

Alternatively, the resource configuration information for PDCCH that schedules second information is used together with a reference value to determine a resource configuration for PDCCH that schedules second information.

FIG. 4 and FIG. 5 respectively illustrate operations performed at a base station and a UE according to an embodiment of the present invention, and the operations correspond to each other. The configuration of information on the resource configuration for PDCCH (PDCCH_Msg2) that schedules a random access response in the system information has been described above in detail with reference to FIG. 4. Method 500 will not be described in detail here.

It should be noted that the first system information and the second system information in the present disclosure are used herein to distinguish among multiple system information, and are not limited to specific system information.

It should be understood that the present disclosure is not limited to the resource configuration for the control channel, but can also be used for resource configuration for a shared channel in a similar manner.

The inventor found that, in the random access process, there is no hybrid automatic repeat request (HARQ) process identifier (ID) field in the current RAR. For example, the HARQ process ID of the Physical Uplink Shared Channel (PUSCH) scheduled by the Physical Downlink Control Channel (PDCCH) is 0 by default. For the contention-based random access process, since there is no uplink data transmission before the random access process, it is no problem that the HARQ process ID of the PUSCH scheduled by the PDCCH is 0 by default. However, for the contention-free random access process, there may be an uplink data transmission before the random access process, and it is possible that the HARQ process IDs of some uplink data are also 0, which will result in confusion of the HARQ process ID. Moreover, the subsequent HARQ process ID for PUSCH transmission are value 0, resulting in unclarity as to whether it is the PUSCH data retransmission before RAR or the RAR scheduling data retransmission, which causes confusion in the uplink data retransmission.

Based on this, the present disclosure provides a method for configuring an HARQ process ID, which is applied to a terminal side and includes the following steps as shown in FIG. 6:

Step S601: Transmitting a random access preamble.

Step S602: Receiving a random access response (RAR) carried in a Physical Downlink Shared Channel (PDSCH) scheduled by a base station through a PDCCH.

Step S603: Determining the HARQ process ID according to the PDCCH or the PDSCH.

Wherein, the process of determining the HARQ process ID according to the PDSCH may include the following ways:

(1) Reading an MAC header message carried in the PDSCH scheduled by the PDCCH and determining RAR format information according to the MAC header message; and determining the HARQ process ID according to the determined RAR format information.

Further, the step of reading the MAC header message carried in the PDSCH scheduled by the PDCCH and determining the RAR format information according to the MAC header message specifically includes two types of processes:

1) Reading each MAC subheader message in the MAC header message in turn until a Random Access Preamble Identification (RAPID) carried in a certain MAC subheader message matches the transmitted random access preamble;

acquiring the RAR format information in each read MAC subheader message.

2) Reading the value of the RAPID carried in the MAC header message;

Determining each RAR format information in the MAC header message according to the value of the RAPID.

(2) Extracting the HARQ process ID from each RAR format information of the RAR carried in the PDSCH scheduled by the PDCCH.

(3) Acquiring indication information carried in the PDCCH scrambled by a Random Access-Radio Network Temporary Identifier (RA-RNTI); and determining the HARQ process ID according to the indication information.

Wherein, the contents included in the acquired indication information carried in the PDCCH scrambled by the RA-RNTI include at least one of the following:

an indication value of the RAR format information;

a number of RARs containing HARQ process IDs;

Wherein, if the indication value of the RAR format information is a first predefined value, it means that the RAR contains the HARQ process ID; if the indication value of the RAR format information is a second predefined value, it means that the RAR does not contains the HARQ process ID.

(4) Acquiring the HARQ process ID carried in the PDCCH scrambled by a C-RNTI.

(5) Acquiring the HARQ process ID carried in the PDSCH scheduled by the PDCCH scrambled by the C-RNTI.

The RAR format information involved in the above-mentioned process of determining the HARQ process ID according to the PDSCH includes:

an RAR not containing HARQ process ID, which is M bits;

an RAR containing the HARQ process ID, which is (M+N) bits;

wherein, M and N both are natural numbers not less than one.

A method for configuring an HARQ process ID is also provided in the present disclosure, which is applied to a base station side as shown in FIG. 7, the method including:

Step S701: Receiving a random access preamble transmitted by a terminal.

Step S702: Scheduling an RAR carried in a PDSCH scheduled through a PDCCH.

The above transmitting process enables the terminal to determine the HARQ process ID according to the PDCCH or the PDSCH.

The way of configuring the HARQ process ID includes the following two types:

(1) Configuring the HARQ process ID in the PDSCH;

(2) Configuring the HARQ process ID in the PDCCH.

For (1), it specifically includes any of the following:

1) Configuring a value of an RAPID in an MAC header message carried in the PDSCH scheduled by the PDCCH, so that the terminal determines RAR format information according to the value of the RAPID;

2) Configuring RAR format information in an MAC header message carried in the PDSCH scheduled by the PDCCH, so that the terminal determines the HARQ process ID according to the RAR format information; and 3) Configuring the HARQ process ID in each RAR format information of the RAR carried in the PDSCH scheduled by the PDCCH.

For (2), it specifically includes any of the following:

1) Carrying indication information in the PDCCH scrambled by the RA-RNTI, and determining the HARQ process ID according to indication information;

2) Carrying the HARQ process ID in the PDCCH scrambled by the C-RNTI; and

3) Carrying the HARQ process ID in the PDSCH scheduled by the PDCCH scrambled by the C-RNTI.

Based on the above method for configuring the HARQ process ID, which is applied to the terminal side and the base station side, an embodiment is specifically described as follows.

With the new data transmission method provided by the present disclosure, the base station may indicate an HARQ process ID of a PUSCH data transmission in the contention-free random access process. The HARQ process ID is transmitted to the user terminal by the following ways: directly using the PDCCH through C-RNTI or RA-RNTI to schedule resources for the contention-free random access process while indicating the HARQ process ID, or changing the MAC header structure of the PDSCH, etc.

The following five types are specifically included:

Determining which RARs contain the HARQ process ID through an indication in the MAC header;

The HARQ process ID being contained in all RARs;

Distinguishing whether to contain the HARQ process ID through random access resource packets;

Indicating in the PDCCH whether to contain the HARQ process ID; and

The HARQ process ID being contained only when the PDCCH scrambled by the C-RNTI schedules a UL grant.

Embodiment 1

In this embodiment, the RAR format may be determined by the following five methods.

Method 1:

Determining which RARs contain the HARQ process ID through an indication in the MAC header.

Since the HARQ process ID is required to be indicated in the RAR for the PUSCH scheduled by the RAR in the contention-free random access process, and the HARQ process ID is not required to be indicated in the RAR for the PUSCH scheduled by the RAR in the contention-based random access process, meanwhile, some RARs in one PDSCH are in the contention-based random access process, and some are in the contention-free random access process, therefore, it is necessary to indicate which RARs contain the HARQ process IDs, and which RARs do not contain the HARQ process IDs; wherein the RAR not containing the HARQ process ID is 20 bits, and the RAR containing the HARQ process ID is (20+N) bits, where N is determined by a protocol, or is determined by a high-layer signaling configuration, for example, N is equal to 4.

In the random access process, the RAR format of the user terminal after transmitting the random access preamble is determined as follows:

If the user terminal retrieves the corresponding downlink control channel information through an RA-RNTI, the downlink control channel information will indicate the location of the downlink shared channel where the specific RAR message is located. Since the time unit in which the downlink control channel is located may be different from the time unit in which the corresponding downlink shared channel is located, the system may have the following two configurations:

In this embodiment, the notification is performed by adding the indication in the RAR format to the MAC header of the RAR. As shown in FIG. 8, the MAC header contains multiple MAC subheaders, which are represented as follows:

E is 1 bit, and if E=0, it indicates that an RAR or padding information is contained after the MAC subheader; if E=1, it indicates that at least one RAPID or MAC subheader in the RAR format is contained after the MAC subheader;

T is 1 bit. The criterion for distinguishing is that T in the first MAC subheader indicates a backoff indication (i.e., T=0) or an RAR format (i.e, T=1), and that T in the other MAC subheaders indicates that T represent the RAR format (i.e., T=0) or the RAPID (i.e., T=1).

R is 1 reserved bit;

BI is a 4-bit backoff indication;

The RAR format indicates that the number of RARs of which the number of the first bits is 20+N. As shown in FIG. 9, if the value indicated by the RAR format is 000011, the number of RARs with HARQ process IDs is 3, i.e., the number of RARs with 20+N bits is 3.

RAPID is a 6-bit RAPID.

In this embodiment, there are three types of MAC subheader format configurations:

Format 1, the structure is E/T/R/R/BI;

Format 2, the structure is E/T/RAR format;

Format 3, the structure is E/T/RAPID.

Wherein, format 1 may present in the MAC header; that is, the first MAC subheader is format 1, as shown in FIG. 9.

The flow of the user terminal interpreting the MAC header message is as follows:

Step 1: Reading the first two bits of the first MAC subheader, which are read to 10, that is, E=1 and T=0, indicating that there are at least one RAPID behind or MAC subheaders in the RAR format, and that the MAC subheader includes backoff indication; reading the 4-bit backoff indication;

Step 2: Reading the first two bits of the second MAC subheader, which are read to 10, that is, E=1 and T=0, indicating that there are at least one RAPID behind and that the MAC subheader contains the RAR format; reading the 6-bit RAR format;

Step 3: Reading each of the subsequent MAC subheaders in turn, and when the user terminal retrieves an RAPID that matches the random access preamble transmitted by itself, reading the RAR according to the RAR format.

Format 1 may not present in the MAC header, i.e., the first MAC subheader is in format 2, as shown in FIG. 10.

The flow of the user terminal interpreting the MAC header message is as follows:

Step 1: Reading the first two bits of the first MAC subheader, which are read to 11, that is, E=1 and T=1, indicating that there are at least one RAPID behind and the MAC subheader contains the RAR format; reading the 6-bit RAR format;

Step 2: Reading each of the subsequent MAC subheaders in turn, and when the user terminal retrieves an RAPID that matches the random access preamble transmitted by itself, reading the RAR according to the RAR format. Wherein, if the RAR indicating to the UE belongs to (20+N) bits, the UE interprets the RAR according to (20+N) bits, and if the RAR indicating to the UE belongs to 20 bits, the UE interprets the RAR according to 20 bits.

As in this embodiment, the RAR format in the MAC subheader is 6 bits, which may indicate at most 64 RAR formats, or may not be M bits, and the specific number of bits is predefined by a protocol or configured by higher-layer signalings.

For the RAR containing the HARQ process ID, the HARQ process ID of the PUSCH scheduled by the RAR is the HARQ process ID value in the RAR, and for the RAR not containing the HARQ process ID, the HARQ process ID value of the PUSCH scheduled by the RAR is zero.

Method 2:

All the RARs contains the HARQ process IDs.

The HARQ process ID may be extracted directly from each RAR format information in the RAR.

For the contention-free random access process, the HARQ process ID in the RAR indicates the HARQ process ID, while for the contention-based random access process, the HARQ process ID in the RAR is used as the reserved field, and the RAR is (20+N) bits, where N is determined by a protocol, or determined by a higher-layer signaling configuration, for example, N is equal to 4.

Method 3:

RAPIDs in the MAC header is grouped, wherein the RARs corresponding to one group of RAPIDs are applicable to contention-free random access and contain the HARQ process IDs, and the RARs corresponding to the other group of RAPIDs are applicable to contention-based random access and do not contain HARQ process IDs. For example, when configuring random access resources, the random access resources are divided into two groups. One group is used for contention-free random access and the other group is used for contention-based random access. The base station may inform to the UE through signaling. When the UE receives the RAR, the UE may determine the format of the corresponding RAR according to the value of the RAPID. For example, {RAPID1, RAPID2} is applicable to contention-free random access, and {RAPID3, RAPID4} is applicable to contention-based random access.

Method 4:

The RAR format is indicated through the PDCCH scrambled by the RA-RNTI; one manner is to indicate in the 1-bit RAR format information of the PDCCH whether all RARs in the PDSCH scheduled by the PDCCH contain the HARQ process IDs or not. When the indication value of the RAR format information is "0", all RARs in the PDSCH scheduled by the PDCCH contain the HARQ process ID, and when the indication value of the RAR format information is "1", all RARs in the PDSCH scheduled by the PDCCH do not contain the HARQ process ID.

Or, the L-bit RAR format information in this PDCCH indicates the number of the RARs containing the HARQ process ID in the PDSCH scheduled by the PDCCH. As shown in FIG. 9, when L is, for example, equal to 6 and the RAR format indication value is 000011, the number of the RARs with HARQ process ID is 3, i.e., the number of RARs with 20+N bits is 3.

Method 5:

The uplink data is directly scheduled through the PDCCH scrambled by the C-RNTI, and the PDCCH contains the HARQ process ID;

Alternatively, the uplink data is directly scheduled through the PDSCH scheduled by the PDCCH scrambled by the C-RNTI, and the PDSCH contains the HARQ process ID.

In the above embodiments, the process of the HARQ process ID is determined through the PDCCH or the PDSCH, thereby avoiding confusion during the retransmission of uplink data.

The Long Term Evolution (LTE) technology supports two duplex modes, which are a Frequency Division Duplex (FDD) mode and a Time Division Duplex (TDD) mode. FIG. 1 is a diagram of a frame structure of a TDD system in the LTE. Each radio frame has a length of 10 milliseconds (ms) and is equally divided into two half-frames each having a length of 5 ms. Each of the two half-frames includes 8 time slots each having a length of 0.5 ms and 3 special fields each having a length of 1 ms. The 3 special fields are a Downlink Pilot Time Slot (DwPTS), a Guard Period (GP) and an Uplink Pilot Time Slot (UpPTS) respectively. Each subframe is comprised of 2 consecutive time slots.

Transmission in the TDD system comprises transmission from a base station to a User Equipment (UE) (referred to as downlink) and transmission from the UE to the base station (referred to as uplink). Based on the frame structure shown in FIG. 1, 10 subframes are shared between the uplink and the downlink every 10 ms, and each subframe is configured either for the uplink or for the downlink. A subframe configured for the uplink is referred to as an uplink subframe and a subframe configured for the downlink is referred to as a downlink subframe. The TDD system supports 7 uplink and downlink configurations. As shown in Table 5, D represents a downlink subframe, U represents an uplink subframe, and S represents a special subframe including the above 3 special fields.

TABLE 5

TDD uplink/downlink configuration

| Configuration serial number | Conversion point period | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Hybrid Automatic Repeat reQuest (HARQ) response information of a Physical Downlink Shared Channel (PDSCH) may be transmitted on a Physical Uplink Shared Channel (PUSCH) or a Physical Uplink Control Channel (PUCCH). For a timing relationship between the PDSCH and the PUCCH, assuming that a UE feeds back HARQ-ACK feedback information on a PUCCH of an uplink subframe n, wherein the PUCCH indicates a PDSCH in a downlink subframe n−k or indicates HARQ-ACK feedback information of a PDCCH/EPDCCH released by Semi Persistent Scheduling (SPS). Here, a value of a TDD configuration K is defined in Table 6, wherein K is a set of M elements, is related to a subframe serial number and the TDD uplink/downlink configuration, and is referred to as a downlink association set. An element k in the set K is referred to as a downlink association element, wherein k=4 for FDD. Hereinafter, a downlink subframe corresponding to the downlink association set is simply referred to as a bundling window, that is, a set {n−k, k∈K} comprised of n−k for all elements k in K. In a PUCCH subframe, one PUCCH resource is allocated to each PDSCH of each downlink subframe for feedback of HARQ-ACK feedback information.

TABLE 6

Downlink association set of TDD uplink/downlink configuration

| Configuration serial number | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In addition, the PDCCH/EPDCCH in which the PDSCH is scheduled comprises a field of HARQ process identifications (Process IDs), which is used to indicate that the same Transmission Blocks (TBs) identified by the HARQ process IDs may be combined. For the FDD, there are 8 HARQ processes, and a field of HARQ process IDs included in the PDCCH/EPDCCH in which the PDSCH is scheduled is 3 bits, which indicate 8 HARQ processes respectively. For HARQ processes of the TDD, a maximum number of HARQ processes may be different for different TDD uplink/downlink configurations. Specifically, as shown in Table 7, a field of HARQ process IDs included in the PDCCH/EPDCCH in which the PDSCH is scheduled is 4 bits, which may indicate a maximum of 16 HARQ processes.

TABLE 7

Maximum number of HARQ processes for TDD uplink/downlink configuration

| TDD uplink/downlink configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

The above description introduces the HARQ timing relationship of the LTE TDD release 10, and another problem related to HARQ is how to handle soft buffers.

In practice, UEs are divided into multiple categories according to their processing capabilities. The division is based on whether the UEs support Multiple Input Multiple Output (MIMO), a maximum number of data streams that support MIMO, a size of soft buffers, etc. Here, the soft buffers are used to store received soft bits when a UE fails to correctly decode data transmitted by a base station, and the soft bits in the soft buffers may be soft-combined during HARQ retransmission to improve the link performance. The processing of the soft buffers affects Rate Matching (RM) for downlink data. In the LTE TDD release 10, a size of the soft buffers of the UE is $N_{soft}$, wherein a specific value of $N_{soft}$ is related to the capability of the UE. Regardless of whether the UE is in a single-carrier mode or a Carrier Aggregation (CA) mode, rate matching is performed according to a soft buffer size $$N_{cb} = \min\left(\left\lfloor \frac{N_{IR}}{C} \right\rfloor, K_w\right)$$

for each encoded block of one transmission block, wherein:

$$N_{IR} = \left\lfloor \frac{N_{soft}}{K_C \cdot K_{MIMO} \cdot \min(M_{DL\_HARQ}, M_{limit})} \right\rfloor;$$

where C is a total number of encoded blocks included in each transmission block;

KMIMO depends on a transmission mode of the UE, and KMIMO=2 for an MIMO transmission mode, and KMIMO=1 for a non-MIMO transmission mode;

$M_{DL\_HARQ}$ is a maximum number of downlink HARQ processes which is determined according to table 7;

$M_{limit}$ is a constant of 8;

$K_w$ is a total number of encoded bits output by turbo coding; and $K_c$ is determined as follows: if $N_{soft}$=35982720, $K_c$=5; if $N_{soft}$=3654144 and the UE cannot support spatial multiplexing of more than 2 layers in the downlink, $K_c$=2; otherwise, $K_c$=1.

That is, regardless of how many serving cells the UE actually operates in, during rate matching, rate matching is performed according to a situation that the UE is configured with only one current serving cell. In this way, when the UE is actually configured with a plurality of serving cells, a result of the above processing is that the hypothetical soft buffer capability for HARQ of one encoded block during rate matching may be greater than the soft buffer capability which can be actually supported by the UE.

In the LTE TDD Release 10, it is assumed that the UE equally allocates its soft buffers to multiple cells. Here, in order to better support HARQ Incremental Redundancy (IR), the base station needs to know which soft bits the UE actually stores when it fails to correctly decode one encoded block. For this purpose, a number of serving cells configured for the UE is denoted as $N_{cells}^{DL}$, and then for each cell, when one encoded block of one transmission block among at least $K_{MIMO} \cdot \min(M_{DL\_HARQ}, M_{limit})$ transmission blocks fails to be decoded, it is specified in the LTE-A that the UE needs to store at least soft bits $w_k, w_{k+1}, \ldots, w_{mod(k+n_{sB}-1, N_{cb})}$ for the encoded block, wherein:

$$n_{SB} = \min\left(N_{cb}, \left\lfloor \frac{N_{soft}}{C \cdot N_{cells}^{CL} \cdot K_{MIMO} \cdot \min(M_{DL\_HARQ}, M_{limit})} \right\rfloor\right);$$

where $w_k$ is a soft bit received by the UE, and k is a minimum one of indexes of various soft bits received by the UE.

The inventor found that the method for processing soft buffers described above is directed to a case that transmission characteristics (for example, bandwidths) of various serving cells do not differ greatly from each other, and thus the soft buffers of the UE may be equally allocated to various serving cells. However, for example, when bandwidths of the serving cells differ greatly from each other, it is uneconomical to allocate the soft buffers equally to various cells, which may result in degradation of the performance of serving cells with larger bandwidths. This is a problem that needs to be solved.

In order to address at least part of the above technical problem, the present application proposes a method for allocating soft buffers of a UE. As shown in FIG. 12, the method comprises the following steps.

In step S1210, first indication information is received from an access point, wherein the first indication information indicates allocation of soft buffers for serving cells.

The access point described in step S1210 may be a base station, or may also be any node capable of implementing functions of a base station. Although the technical solutions according to the embodiments of the present disclosure is described by taking a base station as an example in the following description, it should be illustrated that terms such as NB and eNB etc. may also be equivalently used.

In step S1220, soft buffers corresponding to each of the serving cells is determined according to the first indication information.

As described below, according to various embodiments of the present disclosure, the method may further comprise receiving second indication information from the access point, wherein the second indication information indicates allocation of soft buffers of a specified communication process. In this case, the method may further comprise determining, among the soft buffers corresponding to each of the serving cells, the soft buffers corresponding to the specified communication process according to the second indication information.

In some examples, the method shown in FIG. 12 may further comprise determining rate matching of an encoded block in a transmission block received by the UE and/or soft bits which need to be stored when the UE fails to correctly decode the encoded block, according to the soft buffers allocated to the specified communication process.

In some examples, determining the soft bits which need to be stored when the UE fails to correctly decode the encoded block may comprise determining the soft bits which need to be stored according to a priority of the transmission block corresponding to the encoded block when the UE fails to correctly decode the encoded block.

In some examples, the method shown in FIG. 12 may further comprise sequentially storing the soft bits in the corresponding soft buffer according to a priority of a transmission block corresponding to the specified communication process.

The specified communication process may comprise an HARQ process, or may also be any other communication process in each serving cell which is related to allocation of soft buffers. The technical solutions according to the embodiments of the present disclosure are not limited to the HARQ process.

In some examples, the first indication information may comprise any of a soft buffer size configured for each serving cell, a soft buffer allocation ratio configured for each serving cell, a soft buffer allocation factor configured for each serving cell, a number of soft buffer units configured for each serving cell, and transmission characteristics of each serving cell. Specific explanations and uses of these parameters can be found in the following specific embodiments.

The transmission characteristics of each serving cell described here may comprise at least one of a bandwidth size, a subcarrier width, a time slot length, and a transmission mode of an HARQ-acknowledgement "HARQ-ACK". Of course, other examples are also possible.

The method shown in FIG. 12 may be performed at the UE. Accordingly, a corresponding method may also be performed at an access point. FIG. 13 illustrates a method for allocating soft buffers of a UE performed at the access point. As described above, the access point here may be a base station or any network node capable of implementing functions of a base station. As shown in FIG. 13, the method comprises the following steps.

In step S1310, first indication information is generated to be used by a UE to determine soft buffers corresponding to each of serving cells, wherein the first indication information indicates allocation of soft buffers for the serving cells.

In step S1320, the first indication information is transmitted to the UE.

In some examples, the method shown in FIG. 13 may further comprise transmitting second indication information to the UE, wherein the second indication information indicates allocation of soft buffers for a specified communication process.

In some examples, the method shown in FIG. 13 may further comprise allocating the soft buffers of the specified communication process according to a transmission block corresponding to the specified communication process.

The specified communication process may comprise an HARQ process, or may also be any other communication process in each serving cell which is related to allocation of soft buffers. The technical solutions according to the embodiments of the present disclosure are not limited to the HARQ process.

In some examples, the first indication information may comprise any of a soft buffer size configured for each serving cell, a soft buffer allocation ratio configured for each serving cell, a soft buffer allocation factor configured for each serving cell, a number of soft buffer units configured for each serving cell, and transmission characteristics of each serving cell. Specific explanations and uses of these parameters can be found in the following specific embodiments.

The transmission characteristics of each serving cell described here may comprise at least one of a bandwidth size, a subcarrier width, a time slot length, and a transmission mode of an HARQ-acknowledgement "HARQ-ACK". Of course, other examples are also possible.

The first indication information and the second indication information may be transmitted through explicit signaling or implicit signaling. For example, the explicit signaling may comprise high layer signaling, Media Access Layer (MAC) signaling, or Physical Layer (PHY) signaling. The UE may acquire the above indication information by receiving high layer signaling, MAC signaling or PHY signaling transmitted by the access point (for example, a base station). In some examples, the implicit signaling may comprise transmission characteristics of each serving cell transmitted by the access point, such as a bandwidth size, a subcarrier width, a time slot length, a transmission mode of an HARQ-ACK, etc. of the serving cell. The UE may determine a soft buffer size allocated for each serving cell according to the received transmission characteristics.

Currently, soft buffers are firstly allocated equally according to a number of serving cells configured for the UE, and then soft buffers allocated to each serving cell are then equally allocated according to a minimum of a maximum number of downlink HARQ processes and a constant ($M_{limit}$) of each serving cell. However, due to different bandwidths, time slot lengths and transmitted services of different serving cells in a New Radio (NR) system, soft buffers is inefficient in use due to equal allocation of soft buffers for various serving cells.

In order to make better use of the soft buffers of the UE, in the embodiments of the present disclosure, the soft buffers of the UE may be used differently for various serving cells according to the characteristics of each serving cell, for example, numbers of soft buffers used by various serving cells may be different. The characteristics of each serving cell here comprise a bandwidth size, a subcarrier width, a time slot length, a transmission mode of an HARQ-ACK etc. of the serving cell. In addition, allocation of soft buffers for each serving cell may also be based on services transmitted by the serving cell. The services transmitted by the serving cell here comprise, but are not limited to, Enhanced Mobile BroadBand (eMBB) and Ultra Reliability Low Latency Communication (URLLC) services etc.

In addition, in various HARQ processes of the same serving cell, transmission may also be performed using different subcarrier spaces, different time slot lengths, slot aggregation, or encoded block groups. Therefore, if the same soft buffers are used for different HARQ processes in the same serving cell, the soft buffers are also relatively inefficient in use. Therefore, soft buffers may be allocated to various HARQ processes according to the above different transmission characteristics of various HARQ processes in the serving cell, and the soft buffers of the UE may be used differently for rate matching and storage of soft bits.

The technical solutions of the present application will be described in detail below by using several exemplary embodiments. It should be illustrated that although the technical solutions according to the embodiments of the present disclosure are described below by taking HARQ processes as an example, other types of processes related to allocation of soft buffers may also be applied to the technical solutions according to the embodiments of the present disclosure.

Embodiment 2

In this embodiment, a method of how to allocate soft buffers to different serving cells is described. For each UE, when the UE is configured with N (N is a positive integer greater than or equal to 1) serving cells, different soft buffer sizes may be allocated to various serving cells, and the UE may acquire a soft buffer size (or a number of soft buffers) allocated to each serving cell by receiving explicit signaling transmitted by a base station or by receiving implicit signaling transmitted by the base station, wherein both the soft buffer size and the number of soft buffers are interchangeable. Acquisition of a number of soft buffers allocated to each serving cell for receiving data by the UE by receiving the explicit signaling or the implicit signaling transmitted by the base station will be described below respectively. As shown in FIG. 14, the UE is configured with 3 serving cells, and a total soft buffer size of the UE is allocated to the 3 serving cells to store soft buffer bits. Soft buffer sizes allocated to various serving cells are different.

In a first manner, the UE acquires a soft buffer size allocated to each serving cell for receiving data by receiving the explicit signaling transmitted by the base station.

The explicit signaling may comprise high layer signaling, media access layer signaling or physical layer signaling. The UE may acquire the soft buffer size allocated to each serving cell for receiving data by receiving the high layer signaling, the media access layer signaling or the physical layer signaling transmitted by the base station.

For example, a soft buffer size vk is configured for each serving cell, where k is an index of the serving cell.

For example, a soft buffer allocation ratio rk is configured for each serving cell, where k is an index of the serving cell, and a soft buffer size allocated to each serving cell may be determined according to the soft buffer allocation ratio, for example, a soft buffer size allocated to a serving cell k is $N_{soft}*rk$, where $N_{soft}$ is a total soft buffer size of the UE. For example, assuming that the UE is configured with 3 serving cells and the total soft buffer size of the UE is $N_{soft}$, 30% $N_{soft}$ may be allocated to a serving cell 1, 40% $N_{soft}$ may be allocated to a serving cell 2, and 30% $N_{soft}$ may be allocated to a serving cell 3.

For example, a soft buffer allocation factor $s_k$ is configured for each serving cell, where k is an index of the serving cell, and a soft buffer size allocated to the serving cell may be determined according to the soft buffer allocation factor. For example, a soft buffer size of a serving cell k is $$(N_{soft}*s_k)/\left(\sum_{k=1}^{K} s_k\right),$$

where Nsoft is the total soft buffer size of the UE and K is a number of serving cells configured for the UE. With this method, only a soft buffer allocation factor needs to be configured for a serving cell which is newly configured, and all of the soft buffers may be allocated by the UE, where sk may be a positive integer greater than or equal to 1, sk may be a decimal number less than 1, or sk may also be 0. For example, assuming that the UE is configured with 3 serving cells, the total soft buffer size of the UE is Nsoft, a soft buffer allocation factor for a serving cell 1 is 1,
a soft buffer allocation factor for a serving cell 2 is 2, and a soft buffer allocation factor for a serving cell 3 is 2.

$$(N_{soft}*s_k)/\left(\sum_{k=1}^{K} s_k\right) = N_{soft}*1/(1+2+2) = 1/5 N_{soft}$$

may be allocated to the serving cell 1, $$(N_{soft}*s_k)/\left(\sum_{k=1}^{K} s_k\right) = N_{soft}*2/(1+2+2) = 2/5 N_{soft}$$

may be allocated to the serving cell 2, and $$(N_{soft}*s_k)/\left(\sum_{k=1}^{K} s_k\right) = N_{soft}*2/(1+2+2) = 2/5 N_{soft}$$

may be allocated to the serving cell 3.

For example, the total soft buffer size of the UE may be divided into soft buffer units of a size of U, and Mk soft buffer units may be allocated to each serving cell k, that is, a soft buffer size of U*Mk is allocated to the serving cell k. For example, Mk may be configured by high layer signaling. Alternatively, a number of soft buffer units of the serving cell may be acquired according to a bandwidth of the serving cell. With this method, better sharing of soft buffers among different serving cells can be achieved. For example, assuming that the UE is configured with 3 serving cells and the total soft buffer size of the UE is divided into 10 soft buffer units of a size of U, 3 soft buffer units may be allocated to a serving cell 1, 3 soft buffer units may be allocated to a serving cell 2, and 4 soft buffer units may be allocated to a serving cell 3, as shown in FIG. 15.

The above explicit signaling received by the UE from the base station may be generated or determined by the base station based on transmission characteristics of each serving cell. In some examples, the soft buffers of the UE may be allocated to each serving cell in proportion to a bandwidth size of the serving cell, and corresponding signaling or indication information may be generated. In some examples, the soft buffers of the UE may be allocated to each serving cell in inverse proportion to a sub-carrier width used by the serving cell and corresponding signaling or indication information may be generated. In some examples, the soft buffers of the UE may be allocated to each serving cell in inverse proportion to a time slot length used by the serving cell and corresponding signaling or indication information may be generated. In some examples, when a large retransmission interval is set for an HARQ-ACK of a certain serving cell, a large ratio of the soft buffers of the UE needs to be allocated to the serving cell.

It should be illustrated that allocation of the soft buffers of the UE described here for various transmission characteristic of the serving cells is merely an example for illustrating the embodiments of the present disclosure. In a specific implementation, different allocation manners of the soft buffers of the UE may also be used for the above transmission characteristics, or other transmission characteristics which may be related to allocation of the soft buffers of the UE may also be used. The present disclosure is not limited to the specific transmission characteristics of the serving cells and the specific use of the transmission characteristics.

In addition, the above-mentioned explicit signaling may also be generated or determined based on services transmitted by each serving cell. For example, the soft buffers of the UE may be preferentially allocated to or a large ratio of the soft buffers of the UE may be allocated to a serving cell having transmitted services with a high importance or priority. For example, a small ratio of the soft buffers of the UE may be allocated to a serving cell having transmitted services (for example, URLLC services) with a low latency. It should also be illustrated that the allocation of the soft buffers of the UE described here for the above services is merely an example for describing the embodiments of the present disclosure, and in a specific implementation, other allocation manners may also be used for the above services, or the soft buffers of the UE may even be allocated based on any other services which may be related to the soft buffers of the UE. The present disclosure is not limited to the specific examples above.

In a second manner, the UE acquires a soft buffer size allocated to each serving cell for receiving data by receiving the implicit signaling transmitted by the base station.

The UE may acquire the soft buffer size allocated to each serving cell by receiving the implicit signaling transmitted by the base station. For example, the soft buffer size for each serving cell may be acquired through a system bandwidth of the serving cell transmitted by the base station or a bandwidth configured for the serving cell. For example, assuming that a system bandwidth of a serving cell is 10 MHz, a soft buffer size of the serving cell may be 20% $N_{soft}$, where $N_{soft}$ is a total soft buffer size of the UE.

Although the above description merely illustrates an example in which the UE determines soft buffers of the UE to be allocated to each serving cell according to a bandwidth size of the serving cell, those skilled in the art may also determine the allocation of the soft buffers of the UE using other transmission characteristics of each serving cell. For example, the allocation of the soft buffers of the UE may be determined at the UE in the same manner as that for determining explicit signaling at the base station in the first manner.

In a third manner, the UE acquires a soft buffer size allocated to each serving cell for receiving data by receiving a combination of the explicit signaling and the implicit signaling transmitted by the base station.

For example, the total soft buffer size of the UE may be divided into soft buffer units of a size of U, and the UE may acquire U by receiving high layer signaling, and may acquire a number of soft buffer units which may be allocated to each serving cell according to a bandwidth of the serving cell. For example, assuming that the UE is configured with 3 serving cells, and the total soft buffer size of the UE is divided into 10 soft buffer units of a size of U, if a system bandwidth of a serving cell 1 is 10 MHz, 1 soft buffer unit may be allocated to the serving cell 1, if a system bandwidth of a serving cell 2 is 20 MHz, 2 soft buffer units may be allocated to the serving cell 2, and if a system bandwidth of a serving cell 3 is 20 MHz, 2 soft buffer units may be allocated to the serving cell 3.

Although the above description merely illustrates an example in which the UE determines soft buffers of the UE to be allocated to each serving cell according to a bandwidth size of the serving cell, those skilled in the art may also determine allocation of the soft buffers of the UE using other transmission characteristics of each serving cell. For example, a number of soft buffer units of the UE to be allocated to each serving cell may be determined at the UE in the same manner as that for determining explicit signaling at the base station in the first manner.

The UE may calculate a soft buffer size, denoted as $N_{soft,k}$, of a serving cell k in any of the above three manners. If the serving cell has multiple HARQ processes, the UE may then allocate the soft buffers allocated to each serving cell to various HARQ processes. For example, in order to better support HARQ Incremental Redundancy (IR), the base station needs to know which soft bits the UE actually stores when it fails to correctly decode one encoded block. For this purpose, for each serving cell, when one encoded block of one transmission block among at least $K_{MIMO} \cdot \min(M_{DL\_HARQ}, M_{limit})$ transmission blocks fails to be decoded, the UE needs to store at least soft bits $w_k, \ldots, w_{k+1}, \ldots, w_{mod(k+n_{SB}-1, N_{cb})}$ for the encoded block, wherein:

$$n_{SB} = \min\left(N_{cb}, \left\lfloor \frac{N_{soft,k}}{C \cdot K_{MIMO} \cdot \min(M_{DL\_HARQ}, M_{limit})} \right\rfloor \right);$$

where k is a minimum one of indexes of various soft bits received by the UE; and $M_{DL\_HARQ}$ is configured by high layer signaling or is determined by a protocol.

The following provides several exemplary determination methods which can be used to perform rate matching according to the soft buffers of the UE.

First Method:

It is assumed that the soft buffer size of the UE is $N_{soft}$, wherein a specific value of $N_{soft}$ is related to the capability of the UE. Regardless of whether the UE is in a single-carrier mode or a CA mode, rate matching is performed according to a soft buffer size $$N_{cb} = \min\left(\left\lfloor \frac{N_{IR}}{C} \right\rfloor, K_w\right)$$

for each encoded block of one transmission block, wherein:

$$N_{IR} = \left\lfloor \frac{N_{soft}}{K_C \cdot K_{MIMO} \cdot \min(M_{DL\_HARQ}, M_{limit})} \right\rfloor;$$

where C is a total number of encoded blocks included in each transmission block;

$K_{MIMO}$ depends on a transmission mode of the UE, and $K_{MIMO}=2$ for an MIMO transmission mode, and $K_{MIMO}=1$ for a non-MIMO transmission mode;

$M_{DL\_HARQ}$ may be configured by high layer signaling or may be determined by a protocol;

$M_{limit}$ is a constant of 8;

$K_w$ is a total number of encoded bits output by turbo coding;

$K_c$ is determined as follows: if $N_{soft}=35982720$, $K_c=5$; if $N_{soft}=3654144$ and the UE cannot support spatial multiplexing of more than 2 layers in the downlink, $K_c=2$; otherwise, $K_c=1$, and there may be other methods for determining $K_c$, which are not limited here;

$N_{cb}$ is a number of information bits which may be stored in an encoded block; and $N_{IR}$ is a soft buffer size allocated to the transmission block.

In the above example, regardless of how many serving cells the UE actually operates in, during rate matching, rate matching is performed according to a situation that the UE is configured with only one current serving cell.

Second Method:

It is assumed that the soft buffer size of the UE is $N_{soft}$, wherein a specific value of $N_{soft}$ is related to the capability of the UE. In a CA mode, different soft buffer sizes may be used for rate matching for different serving cells. The UE may acquire a soft buffer size during rate matching for each serving cell by receiving explicit signaling and/or implicit signaling transmitted by the base station. It should be illustrated that the soft buffer size during rate matching for each serving cell may be different from a soft buffer size allocated to the serving cell for receiving data.

For example, rate matching is performed according to a soft buffer size $$N_{cb,k} = \min\left(\left\lfloor \frac{N_{IR,k}}{C} \right\rfloor, K_w\right)$$

for an encoded block k of one transmission block, wherein:

$$N_{IR,k} = \left\lfloor \frac{N_{soft}}{l_k \cdot K_{MIMO} \cdot \min(M_{DL\_HARQ}, M_{limit})} \right\rfloor;$$

where C is a total number of encoded blocks included in each transmission block;

$K_{MIMO}$ depends on a transmission mode of the UE, and $K_{MIMO}=2$ for an MIMO transmission mode, and $K_{MIMO}=1$ for a non-MIMO transmission mode;

$M_{DL\_HARQ}$ may be configured by high layer signaling or may be determined by a protocol;

$M_{limit}$ is a constant of 8;

$K_w$ is a total number of encoded bits output by turbo coding;

$N_{cb,k}$ is a number of information bits which may be stored in an encoded block of a serving cell k; and $l_k$ is a rate matching soft buffer factor for the serving cell k. The UE may acquire $l_k$ by receiving the explicit signaling and implicit signaling transmitted by the base station. This parameter may be determined at the base station according to practical transmission requirements, which is not described here again.

When rate matching and which soft bits are actually stored when the encoded block fails to be correctly decoded are described, the embodiments of the present disclosure are described based on a situation that the same soft buffer size is used for different HARQ processes of the same serving cell. However, the method according to the present embodiment may also be extended to a situation that different soft buffer sizes are used for different HARQ processes of the same serving cell.

Embodiment 3

In the present embodiment, a method of how to allocate soft buffers to different HARQ processes in the same serving cell is described. When the UE may receive different subcarrier spaces or different time slots, and may perform retransmission using different multi-slot aggregation or different encoded block Groups (CBGs) in different HARQ processes in a serving cell, numbers of soft buffers may be different for various HARQ processes. The UE may determine soft buffers for various HARQ processes by receiving explicit signaling or implicit signaling transmitted by the base station. It should be illustrated that the explicit signaling or implicit signaling transmitted by the base station here may be the same signaling as or different signaling from the explicit signaling or implicit signaling transmitted by the base station for allocating soft buffers of the UE to each serving cell.

In some examples, the soft buffers may be independently allocated to HARQ processes with different subcarrier spaces, that is, frequency bands in different subcarrier spaces may be regarded as different serving cells. For example, if a serving cell needs an HARQ process supporting two different subcarrier spaces, the serving cell may be regarded as two serving cells to be processed when the soft buffers are allocated.

In some examples, a number $M_{DL\_HARQ,k}$ of reference HARQ processes may be determined for a serving cell k. The number of reference HARQ processes may be configured through high layer signaling or may be indicated through other explicit signaling or may be acquired through implicit signaling. Then, a soft buffer size allocated to the serving cell is allocated to various reference HARQ processes according to the number of reference HARQ processes. Then, each time data is actually received, a soft buffer size used for actual reception is determined according to a comparison between a transmission block of the actually received HARQ process and a transmission block of the reference HARQ process. The UE may determine the comparison between the transmission block of the actually received HARQ process and the transmission block of the reference HARQ process by receiving explicit signaling or implicit signaling. For example, if an HARQ process in which a PDSCH of one CBG is scheduled is used as a reference HARQ process, a soft buffer size of an HARQ process in which a PDSCH of two CBGs is scheduled is twice the soft buffer size of the reference HARQ process. As another example, if an HARQ process in which a PDSCH of one time slot is scheduled is used as a reference HARQ process, a soft buffer size of an HARQ process in which a PDSCH of two time slots is scheduled during slot aggregation is twice the soft buffer size of the reference HARQ process. As another example, if an HARQ process in which a PDSCH of one OFDM symbol in one time slot is scheduled is used as a reference HARQ process, a soft buffer size of an HARQ process in which a PDSCH of four OFDM symbols in one time slot is scheduled is four times the soft buffer size of the reference HARQ process, and so on.

Then, rate matching and storage of soft bits of data are performed according to the soft buffer size of each HARQ process. The soft buffer size of each HARQ process for rate matching may be different from the soft buffer size of each HARQ process for storage of soft bits. For example, assuming that a soft buffer size used for rate matching for an HARQ process p of a serving cell k is sk,p, a process of rate matching is as follows. For each encoded block of a transmission block of one HARQ process p, rate matching is performed according to a soft buffer size $$N_{cb} = \min\left(\left\lfloor \frac{s_{k,p}}{C} \right\rfloor, K_w\right),$$

where C is a number of encoded blocks in the transmission block and $K_w$ is a total number of output encoded bits.

It is assumed that a soft buffer size for storage of soft bits of data for an HARQ process p of a serving cell d is qd,p.

The base station needs to know which soft bits the UE actually stores when it fails to correctly decode an encoded block. For this purpose, for a transmission block of an HARQ process p for each serving cell, when at least one encoded block of the transmission block fails to be decoded, the UE needs to store at least soft bits $w_k, w_{k+1}, \ldots, w_{mod(k+n_{SB}-1,N_{cb})}$ for the encoded block, . . . , wherein:

$$n_{SB} = \min\left(N_{cb}, \left\lfloor \frac{q_{d,p}}{C \cdot K_{MIMO}} \right\rfloor\right);$$

where k is a minimum one of indexes of various soft bits received by the UE.

Embodiment 4

Determination of a soft buffer size allocated to each serving cell is described in the embodiment 2, and allocation of the soft buffer size allocated to each serving cell to HARQ processes of the serving cell after the soft buffer size allocated to the serving cell is determined is described in the embodiment 3. The two allocation processes may be performed in two allocation steps; however, in some embodiments, the soft buffer size may also be allocated to the HARQ processes of each serving cell through only one allocation step.

The total soft buffer size of the UE may be divided into soft buffer units of a size of U, and U may be configured through high layer signaling. In some examples, U may be defined as a soft buffer size (a number of soft buffers) required for a particular number of transmission blocks (for example, basic transmission blocks, such as one code block group, but the present disclosure is not limited thereto, and other values may also be used). Then, each time data is actually received, a number of soft buffer units used for actual reception is determined according to a comparison between a transmission block of the actually received HARQ process of a serving cell and a basic transmission block. For example, based on a soft buffer size required for a particular number of transmission blocks, the soft buffers of the UE may be allocated to various HARQ processes of each serving cell in proportion to a number of transmission blocks used for each of the HARQ processes of each serving cell. In some examples, the UE may also determine the comparison between a transmission block of the actually received HARQ process and a basic transmission block by receiving explicit signaling or implicit signaling.

For example, in any configured serving cell, a soft buffer size of an HARQ process in which a PDSCH of one code block group is scheduled is U, and a soft buffer size of an HARQ process in which a PDSCH of two code block groups is scheduled is 2U.

A number $M_{DL\_HARQ,k}$ of reference HARQ processes is determined for each serving cell k configured for the UE, wherein the UE is configured with K serving cells, and the total soft buffer size $N_{soft}$ of the UE is divided into soft buffer units of a size of $$(N_{soft}) / \left(\sum_{k=1}^{K} M_{DL\_HARQ,k}\right).$$

Each time data is actually received, a number of soft buffer units used for actual reception is determined according to a comparison between a transmission block of the actually received HARQ process of the serving cell and a transmission block of the reference HARQ process. In some examples, the UE may also determine the comparison between a transmission block of the actually received HARQ process and a transmission block of the reference HARQ process by receiving explicit signaling or implicit signaling.

Embodiment 5

When services received by the UE belong to services with a high priority, a different method may be used during rate matching and when the UE stores soft bits when it fails to correctly decode one encoded block.

For example, for each encoded block k of one transmission block, rate matching may be performed according to a soft buffer size $K_w$, where $K_w$ is a total number of encoded bits output by coding.

At a receiving terminal, a number of bits reserved by the UE may be min{a number of all soft bits of data received by the UE, $K_w$}, or may be $K_w$. All soft bits of the data received by the UE here include all soft bits after data during initial data transmission and data during retransmission are combined. If a number of idle soft buffers is not large enough to store all soft bits of data of services with high reliability and a high priority when the data of the services with high reliability and a high priority is stored, (a part of) soft bits of data of services without high reliability and a high priority may be discarded until the number of idle soft buffers (i.e., a soft buffer size) is sufficient to store all soft bits of the data of the services with high reliability and a high priority. The soft bits of the data of the services without high reliability and a high priority may be discarded using any data discard method which is common in the art, and details thereof are not described here again.

The UE may know whether scheduled PDSCH data is data with a high priority by receiving information transmitted by the base station (for example, through configuration of high layer signaling or indication of physical layer signaling).

FIG. 16 is a block diagram showing a structure of a Base Station (BS) 10 according to an embodiment of the present disclosure. As shown, the base station 10 may comprise a generation module 12 and a transmission module 14. The base station 10 may further comprise a storage module 16.

The generation module 12 may be configured to generate first system information, the first system information including resource configuration information for PDCCH that schedules second information.

The transmission module 14 may be configured to transmit the generated first system information.

The base station shown in FIG. 16 may further include a reception module configured to receive the random access preamble a random access preamble transmitted by a User Equipment (UE). The transmission module 14 is further configured to schedule a random access response (RAR) carried in a physical downlink shared channel (PDSCH) through a physical downlink control channel (PDCCH) so that the UE determines a hybrid automatic repeat request (HARQ) process ID according to the PDCCH or the PDSCH.

The base station shown in FIG. 16 may further include a generating module configured to generate first indication information to be used by a User Equipment (UE) to determine soft buffers corresponding to each of serving cells according to the first indication information, wherein the first indication information indicates allocation of soft buffers for the serving cells. The transmission module 14 is further configured to transmit the first indication information to the UE.

FIG. 17 is a block diagram showing a structure of a user equipment 20 according to an embodiment of the present disclosure. AS shown, the user equipment 20 may comprise a reception module 22 and a deriving module 24. The user equipment 20 may further comprise a storage module 26.

The reception module 22 may be configured to receive first system information transmitted from a base station.

The deriving module 24 may be configured to derive resource configuration information for PDCCH that schedules second information from the received first system information The user equipment shown in FIG. 17 may further include a transmission module configured to transmit a random access preamble. The reception module 22 may further be configured to receive a random access response (RAR) carried in a physical downlink shared channel (PDSCH) scheduled through a PDCCH. The user equipment shown in FIG. 17 may further include a processing module configured to determine a hybrid automatic repeat request (HARQ) process ID according to the PDCCH or the PDSCH.

The reception module 22 may further be configured to receive first indication information, wherein the first indication information indicates allocation of soft buffers for serving cells. The processing module may further be configured to determine soft buffers corresponding to each of the serving cells according to the first indication information.

The base station according to the above embodiment of the present disclosure may be configured to perform the method shown in FIGS. 4 and/or 7 and/or 13. The user equipment according to the embodiment of the present disclosure may be configured to perform the method shown in FIGS. 5 and/or 6 and/or 12. The operations are not described in detail herein for simplicity.

In embodiments of the disclosure, the

FIG. 18 is a block diagram showing a computer system that can be implemented as a base station or a user equipment according to an embodiment of the present disclosure.

As shown in FIG. 18, the computing system 1800 includes a processor 1810, a computer-readable storage medium 1820, an output interface 1830, and an input interface 1840. The computing system 1800 may perform the method described above with reference to FIG. 4, 5, 6, 7, 12 or 13 to configure control channel resources for information such as random access related messages, paging information, or other system information.

Specifically, the processor 1810 may include, for example, a general purpose microprocessor, an instruction set processor, and/or related chip sets, and/or dedicated microprocessors (e.g., application specific integrated circuits (ASICs)), and so on. The processor 1810 may also include an onboard memory for cache usage. The processor 1810 may be a single processing unit or a plurality of processing units for performing different actions of the flow described with reference to FIG. 4, 5, 6, 7, 12 or 13.

The computer-readable storage medium 1820 may be, for example, any medium that can contain, store, communicate, propagate, or transmit the instructions. For example, a readable storage medium may include, but is not limited to, an electronic, magnetic, optical, electromagnetic, infrared, or semiconductor system, means, device, or propagation medium. Some examples of readable storage media include: magnetic storage devices, such as magnetic tapes or hard disks (HDDs); optical storage devices, such as compact discs (CD-ROMs); memories, such as random access memory (RAM) or flash memory; and/or wired/wireless communication link.

The computer-readable storage medium 1820 may include a computer program 1821, which may include code/computer-executable instructions that, when executed by the processor 1810, cause the processor 1810 to perform, for example, the methods described above in connection with FIG. 4, 5, 6, 7, 12 or 13 and any variation thereof.

The computer program 1821 may be configured to comprise computer program code including, for example, a computer program module. For example, in an example embodiment, the code in the computer program 1821 may include one or more program modules including, for example, 1821A, 1821B, It should be noted that the division manner and the number of modules are not fixed, and those skilled in the art can use suitable program modules or program module combinations according to actual conditions, and when these program module combinations are executed by the processor 1810, the processor 1810 may perform the methods described above in connection with FIG. 4, 5, 6, 7, 12 or 13 and any variation thereof.

According to an embodiment of the present disclosure, the processor 1810 may use the output interface 1830 and the input interface 1840 to perform the methods described above in connection with FIG. 4, 5, 6, 7, 12 or 13 and any variation thereof.

A method for configuring channel resource includes receiving first system information, and deriving resource configuration information for physical downlink control channel (PDCCH) that schedules second information from the received first system information.

Herein the second information is at least one of a random access response, a random access contention resolution message, re-transmitted random access message 3, paging message, and second system information. Herein the resource configuration information for PDCCH that schedules second information comprises at least one of information indicating a resource start position to monitor PDCCH that schedules second information, information indicating a resource size to monitor PDCCH that schedules second information, and information indicating a periodicity to monitor PDCCH that schedules second information. Herein the resource configuration information for PDCCH that schedules second information is configured by establishing a relation to a resource configuration for PDCCH that schedules the first system information. Herein the resource configuration information for PDCCH that schedules second information comprises first indication information that indicates whether the resource configuration information for PDCCH that schedules second information is the same as resource configuration information for PDCCH that schedules the first system information, and/or second indication information on an offset between the resource configuration information for PDCCH that schedules second information and the resource configuration information for PDCCH that schedules the first system information. Herein the resource configuration information for PDCCH that schedules second information is configured separately from a resource configuration for PDCCH that schedules the first system information. Herein the resource configuration information for PDCCH that schedules second information is used together with a look-up table to determine a resource configuration for PDCCH that schedules second information, or the resource configuration information for PDCCH that schedules second information is used together with a reference value to determine a resource configuration for PDCCH that schedules second information.

The method is further includes transmitting a random access preamble, and receiving a random access response (RAR) carried in a physical downlink shared channel (PDSCH) scheduled through a PDCCH, and determining a hybrid automatic repeat request (HARQ) process ID according to the PDCCH or the PDSCH. Herein the determining the HARQ process ID according to the PDSCH includes reading an MAC header message carried in the PDSCH scheduled by the PDCCH and determining RAR format information according to the MAC header message, and determining the HARQ process ID according to the determined RAR format information, or extracting the HARQ process ID from each RAR format information of the RAR carried in the PDSCH scheduled by the PDCCH. Herein the reading the MAC header message carried in the PDSCH scheduled by the PDCCH and determining the RAR format information according to the MAC header message includes reading each MAC subheader message in the MAC header message in turn until a Random Access Preamble Identification (RAPID) carried in a certain MAC subheader message matches the transmitted random access preamble, and acquiring the RAR format information in each read MAC subheader message, or reading the value of the Random Access Preamble Identification (RAPID) carried in the MAC header message, and determining each RAR format information in the MAC header message according to the value of the RAPID. Herein the determining the HARQ process ID according to the PDCCH includes acquiring indication information carried in the PDCCH scrambled by a Random Access-Radio Network Temporary Identifier (RA-RNTI), and determining the HARQ process ID according to the indication information, or acquiring the HARQ process ID carried in the PDCCH scrambled by a Cell-Radio Network Temporary Identifier (C-RNTI), or acquiring the HARQ process ID carried in the PDSCH scheduled by the PDCCH scrambled by the C-RNTI. Herein the contents included in the acquired indication information carried in the PDCCH scrambled by the RA-RNTI comprises at least one of the following: an indication value of the RAR format information, a number of RARs containing the HARQ process IDs, and, if the indication value of the RAR format information is a first predefined value, it means that the RAR contains the HARQ process ID, if the indication value of the RAR format information is a second predefined value, it means that the RAR does not contain the HARQ process ID.

The method further includes receiving first indication information, herein the first indication information indicates allocation of soft buffers for serving cells, and determining soft buffers corresponding to each of the serving cells according to the first indication information.

The method further includes receiving second indication information, Herein the second indication information indicates allocation of soft buffers for a specified communication process, and determining, among the soft buffers corresponding to each of the serving cells, the soft buffers corresponding to the specified communication process according to the second indication information.

The method further includes determining rate matching of an encoded block in a received transmission block and/or soft bits which need to be stored when it is failed to correctly decode the encoded block according to the soft buffers allocated to the specified communication process. Herein determining soft bits which need to be stored when it is failed to correctly decode the encoded block includes determining the soft bits which need to be stored according to a priority of the transmission block corresponding to the encoded block when it is failed to correctly decode the encoded block.

The method further includes sequentially storing the soft bits in the corresponding soft buffers according to a priority of a transmission block corresponding to the specified communication process. Herein the specified communication process comprises a hybrid automatic repeat request (HARQ) process. Herein the first indication information comprises any of a soft buffer size configured for each serving cell, a soft buffer allocation ratio configured for each serving cell, a soft buffer allocation factor configured for each serving cell, a number of soft buffer units configured for each serving cell, and transmission characteristics of each serving cell. Herein the transmission characteristics of each serving cell comprise at least one of a bandwidth size, a subcarrier width, a time slot length, and a transmission mode of an HARQ-acknowledgment (HARQ-ACK).

A method for configuring channel resource includes generating first system information, the first system information including resource configuration information for physical downlink control channel (PDCCH) that schedules second information, and transmitting the first system information. Herein the second information is at least one of: a random access response, a random access contention resolution message, retransmitted random access message 3, paging message, and second system information. Herein the resource configuration information for PDCCH that schedules second information comprises at least one of information indicating a resource start position to monitor PDCCH that schedules second information, information indicating a resource size to monitor PDCCH that schedules second information, and information indicating a periodicity to monitor PDCCH that schedules second information. Herein the resource configuration information for PDCCH that schedules second information is configured by establishing a relation to a resource configuration for PDCCH that schedules the first system information. Herein the resource configuration information for PDCCH that schedules second information includes first indication information that indicates whether the resource configuration information for PDCCH that schedules second information is the same as resource configuration information for PDCCH that schedules the first system information, and/or second indication information on an offset between the resource configuration information for PDCCH that schedules second information and the resource configuration information for PDCCH that schedules the first system information. Herein the resource configuration information for PDCCH that schedules second information is configured separately from a resource configuration for PDCCH that schedules the first system information. Herein the resource configuration information for PDCCH that schedules second information is used together with a look-up table to determine a resource configuration for PDCCH that schedules second information, or the resource configuration information for PDCCH that schedules second information is used together with a reference value to determine a resource configuration for PDCCH that schedules second information.

The method further includes receiving a random access preamble transmitted by a User Equipment (UE), and scheduling a random access response (RAR) carried in a physical downlink shared channel (PDSCH) through a physical downlink control channel (PDCCH) so that the UE determines a hybrid automatic repeat request (HARQ) process ID according to the PDCCH or the PDSCH.

The method further includes configuring the HARQ process ID in the PDSCH, or configuring the HARQ process ID in the PDCCH. Herein the configuring the HARQ process ID in the PDSCH comprises any one of the following: configuring a value of a random access preamble identification (RAPID) in an MAC header message carried in the PDSCH scheduled by the PDCCH, so that the UE determines RAR format information according to the value of the RAPID, configuring RAR format information in an MAC header message carried in the PDSCH scheduled by the PDCCH, so that the UE determines the HARQ process ID according to the RAR format information, configuring the HARQ process ID in each RAR format information of the RAR carried in the PDSCH scheduled by the PDCCH. Herein the configuring the HARQ process ID in the PDCCH comprises any of the following: carrying indication information in the PDCCH scrambled by a Random Access-Radio Network Temporary Identifier (RA-RNTI), and determining the HARQ process ID according to the indication information, carrying the HARQ process ID in the PDCCH scrambled by a Cell-Radio Network Temporary Identifier (C-RNTI), carrying the HARQ process ID in the PDSCH scheduled by the PDCCH scrambled by the C-RNTI.

The method includes generating first indication information to be used by a User Equipment (UE) to determine soft buffers corresponding to each of serving cells according to the first indication information, Herein the first indication information indicates allocation of soft buffers for the serving cells, and transmitting the first indication information to the UE.

The method further includes transmitting second indication information to the UE, Herein the second indication information indicates allocation of soft buffers for a specified communication process.

The method further includes allocating the soft buffers to the specified communication process according to a transmission block corresponding to the specified communication process. Herein the specified communication process comprises a HARQ process. Herein the first indication information comprises any of: a soft buffer size configured for each serving cell, a soft buffer allocation ratio configured for each serving cell, a soft buffer allocation factor configured for each serving cell, a number of soft buffer units configured for each serving cell, and transmission characteristics of each serving cell. Herein the transmission characteristics of each serving cell comprise at least one of a bandwidth size, a subcarrier width, a time slot length, and a transmission mode of an HARQ-acknowledgment (HARQ-ACK).

The methods and related devices of the present disclosure have been described above in connection with the preferred embodiments. The present disclosure provides a mechanism for configuring control channel resources for information such as random access related messages, paging messages, and other system information, which facilitates efficient random access procedures, paging procedures, and the like.

Those skilled in the art will understand that the above illustrated method is merely exemplary. The method of the present disclosure is not limited to the steps and sequences shown above. The base station and the user equipment shown above may include more modules, and may include for example, modules already available or developed in the future that can be used for base stations or UEs, and the like. The various identifiers shown above are merely exemplary and not limiting, and the disclosure is not limited to the specific information elements that are examples of such identifiers. Many variations and modifications can be made by those skilled in the art in light of the teachings of the illustrated embodiments.

It should be understood that the above-described embodiments of the present disclosure can be implemented by software, hardware, or a combination of both software and hardware. For example, the various components inside the base station and the user equipment in the above embodiments can be implemented by various devices including but not limited to analog circuit devices, digital circuit devices, digital signal processing (DSP) circuits, and programmable processing devices, application specific integrated circuits (ASICs), field programmable gate arrays (FPGAs), programmable logic devices (CPLDs), and so on.

In the present application, the "base station" refers to a mobile communication data and control switching center having large transmission power and a relatively large coverage area, and includes functions such as resource allocation scheduling and data receiving and sending. The "user equipment" refers to a user mobile terminal, and includes, for example, a mobile phone, a notebook, or the like that can perform wireless communication with a base station or a micro base station.

In addition, embodiments of the disclosure disclosed herein may be implemented on a computer program product. More specifically, the computer program product is a product having a computer readable medium on which computer program logic is encoded, and when executed on a computing device, the computer program logic provides related operations to implement the above technical solution of the present disclosure. When executed on at least one processor of a computing system, the computer program logic causes the processor to perform the operations (methods) described in the embodiments of the present disclosure. The arrangement of the disclosure is typically provided as software, code, and/or other data structures provided or encoded on a computer-readable medium, such as an optical medium (e.g., CDROM), floppy disk or hard disk, etc., or firmware or microcode on at least one of ROM or RAM or PROM chip, or downloadable software images, shared databases, etc. in one or more modules. Software or firmware or such a configuration may be installed on a computing device such that one or more processors in the computing device perform the techniques described in the embodiments of the present disclosure.

Although the present invention has been described above in connection with preferred embodiments of the present disclosure, it will be apparent to those skilled in the art that various modifications, substitutions and changes can be made to the present disclosure without departing from the spirit and scope of the present invention. Therefore, the present invention should not be limited by the above-described embodiments but should be defined by the appended claims and their equivalents.

The invention claimed is:

1. A method performed by a user equipment (UE) in a wireless communication system, the method comprising:
receiving, from a base station, a message of a physical broadcast channel including information for indicating a resource configuration for a physical downlink control channel (PDCCH) associated with a system information block type 1 (SIB1);
receiving, from the base station, the SIB1 based on the resource configuration for the PDCCH associated with the SIB1, wherein the SIB1 includes information for indicating whether a resource configuration for a PDCCH associated with a random access response (RAR) is provided in the message or not;
transmitting, to the base station, a random access preamble; and
monitoring the PDCCH associated with the RAR for the random access preamble based on the resource configuration for the PDCCH associated with the SIB1 in case that the information indicates that the resource configuration for the PDCCH associated with the RAR is provided in the message.

2. The method of claim 1, further comprising:
monitoring a PDCCH associated with a downlink message based on the resource configuration for the PDCCH associated with the SIB1 in case that the SIB1 includes information indicating that the resource configuration for the PDCCH associated with the downlink message is provided in the message,
wherein the downlink message comprises a paging or other system information.

3. The method of claim 1, wherein the resource configuration for the PDCCH associated with the SIB1 comprises a resource size of resources used to monitor the PDCCH associated with the SIB1.

4. The method of claim 1, further comprising:
identifying a monitoring periodicity of the PDCCH associated with the RAR, and a time-domain start position for the monitoring of the PDCCH associated with the RAR in the SIB1,
wherein the PDCCH associated with the RAR is monitored according to the monitoring periodicity and the time-domain start position.

5. The method of claim 1, wherein the message includes position information for the SIB1 in a frequency domain.

6. A user equipment (UE) comprising:
at least one processor; and
a transceiver operatively coupled to the at least one processor, configured to:
receive, from a base station, a message of a physical broadcast channel including information for indicating a resource configuration for a physical downlink control channel (PDCCH) associated with a system information block type 1 (SIB1);
receive, from the base station, the SIB1 based on the resource configuration for the PDCCH associated with the SIB1, wherein the SIB1 includes information for indicating whether a resource configuration for a PDCCH associated with a random access response (RAR) is provided in the message or not;
transmit, to the base station, a random access preamble; and
monitor the PDCCH associated with the RAR for the random access preamble based on the resource configuration for the PDCCH associated with the SIB1 in case that the information indicates that the resource configuration for the PDCCH associated with the RAR is provided in the message.

7. The UE of claim 6,
wherein the at least one processor is further configured to monitor a PDCCH associated with a downlink message based on the resource configuration for the PDCCH associated with the SIB1 in case that the SIB1 includes information indicating that the resource configuration for the PDCCH associated with the downlink message is provided in the message, and
wherein the downlink message comprises a paging or other system information.

8. The UE of claim 6, wherein the resource configuration for the PDCCH associated with the SIB1 comprises a resource size of resources used to monitor the PDCCH associated with the SIB1.

9. The UE of claim 6,
wherein the at least one processor is further configured to identify a monitoring periodicity of the PDCCH associated with the RAR, and a time-domain start position for the monitoring of the PDCCH associated the RAR in the SIB1, and
wherein the PDCCH associated with the RAR is monitored according to the monitoring periodicity and the time-domain start position.

10. The UE of claim 6, wherein the message includes position information for the SIB1 in a frequency domain.

11. A method performed by a base station in a wireless communication system, the method comprising:
transmitting, to a user equipment (UE), a message of a physical broadcast channel including information for indicating a resource configuration for a physical downlink control channel (PDCCH) associated with a system information block type 1 (SIB1);
transmitting, to the UE, the SIB1 based on the resource configuration for the PDCCH associated with the SIB1, wherein the SIB1 includes information for indicating whether a resource configuration for a PDCCH associated with a random access response (RAR) is provided in the message or not;
receiving, from the UE, a random access preamble; and
transmitting, to the UE, the RAR for the random access preamble based on the resource configuration for the PDCCH associated with the SIB1 in case that the information indicates that the resource configuration for the PDCCH associated with the RAR is provided in the message.

12. The method of claim 11, further comprising:
transmitting a downlink message based on the resource configuration for the PDCCH associated with the SIB1 in case that the SIB1 includes information indicating that the resource configuration for the PDCCH associated with the downlink message is provided in the message,
wherein the downlink message comprises a paging or other system information.

13. The method of claim 11, wherein the resource configuration for the PDCCH associated with the SIB1 comprises a resource size of resources used to monitor the PDCCH associated with the SIB1.

14. The method of claim 11, wherein the message includes position information for the SIB1 in a frequency domain.

15. A base station in a wireless communication system, the base station comprising:
at least one processor; and
a transceiver operatively coupled to the at least one processor, configured to:
transmit, to a user equipment (UE), a message of a physical broadcast channel including information for indicating a resource configuration for a physical downlink control channel (PDCCH) associated with a system information block type 1 (SIB1);
transmit, to the UE, the SIB1 based on the resource configuration for the PDCCH associated with the SIB1, wherein the SIB1 includes information for indicating whether a resource configuration for a PDCCH associated with a random access response (RAR) is provided in the message or not;

receive, from the UE, a random access preamble; and transmit, to the UE, the RAR for the random access preamble based on the resource configuration for the PDCCH associated with the SIB1 in case that the information indicates that the resource configuration for the PDCCH associated with the RAR is provided in the message.

16. The base station of claim 15, wherein the at least one processor is further configured to transmit a downlink message based on the resource configuration for the PDCCH associated with the SIB1 in case that the SIB1 includes information indicating that the resource configuration for the PDCCH associated with the downlink message is provided in the message, and wherein the downlink message comprises a paging or other system information.

17. The base station of claim 16, wherein the resource configuration for the PDCCH associated with the SIB1 comprises a resource size of resources used to monitor the PDCCH associated with the SIB1.

18. The base station of claim 16, wherein the message includes position information for the SIB1 in a frequency domain.

\* \* \* \* \*